US012112460B2

(12) United States Patent
Yu

(10) Patent No.: US 12,112,460 B2
(45) Date of Patent: Oct. 8, 2024

(54) IMAGE PROCESSING METHOD AND APPARATUS

(71) Applicant: HUAWEI TECHNOLOGIES CO., LTD., Shenzhen (CN)

(72) Inventor: Quanhe Yu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 379 days.

(21) Appl. No.: 17/564,653

(22) Filed: Dec. 29, 2021

(65) Prior Publication Data

US 2022/0122236 A1  Apr. 21, 2022

Related U.S. Application Data

(63) Continuation of application No. PCT/CN2020/092320, filed on May 26, 2020.

(30) Foreign Application Priority Data

Jul. 11, 2019  (CN) .......................... 201910626171

(51) Int. Cl.
*G06T 5/90* (2024.01)
*G06T 5/92* (2024.01)

(52) U.S. Cl.
CPC ...... *G06T 5/92* (2024.01); *G06T 2207/10016* (2013.01); *G06T 2207/20208* (2013.01)

(58) Field of Classification Search
CPC ............. G06T 5/92; G06T 2207/10016; G06T 2207/20208; G06T 2207/10024; G06T 5/90; G06T 3/40; G09G 5/10; G09G 2320/0673; G09G 2360/16; G09G 2370/04; G06F 3/14
USPC .......................................................... 382/274
See application file for complete search history.

(56) References Cited

U.S. PATENT DOCUMENTS

| | | | |
|---|---|---|---|
| 9,230,509 B2 * | 1/2016 | Van Der Vleuten | ...... G06T 3/10 |
| 10,075,655 B2 * | 9/2018 | Tao | ............ G06T 5/94 |
| 2005/0231605 A1 | 10/2005 | Nakami et al. | |
| 2017/0358063 A1 | 12/2017 | Chen et al. | |

(Continued)

FOREIGN PATENT DOCUMENTS

| | | |
|---|---|---|
| CN | 108090879 A | 5/2018 |
| CN | 109479153 A | 3/2019 |
| EP | 0583898 A2 | 2/1994 |

(Continued)

*Primary Examiner* — Neil R McLean
(74) *Attorney, Agent, or Firm* — Maier & Maier, PLLC

(57) ABSTRACT

An image processing method includes obtaining a target picture and an initial tone mapping curve of the target picture, determining a plurality of interpolation points based on luminance information and/or dynamic metadata of the target picture, and determining a spline function that passes through the plurality of interpolation points, where the spline function is smoothly connected to the initial tone mapping curve at at least one of the plurality of interpolation points the initial tone mapping curve is modified based on the spline function to obtain a modified tone mapping curve of the target picture; and tone mapping is performed on the target picture based on the modified tone mapping curve. This image processing apparatus enables a display device to vividly and realistically reproduce a scene in a real world.

17 Claims, 8 Drawing Sheets

(56) References Cited

U.S. PATENT DOCUMENTS

2018/0061026 A1\* 3/2018 Kozuka .................... H04N 9/69
2020/0005441 A1\* 1/2020 Pytlarz ..................... G06T 5/92

FOREIGN PATENT DOCUMENTS

| JP | 201074222 A | | 4/2010 |
| JP | 2010074222 A | \* | 4/2010 |
| JP | 5932392 B2 | | 6/2016 |
| WO | 2018111682 A1 | | 6/2018 |

\* cited by examiner

IMAGE PROCESSING METHOD AND APPARATUS

CROSS-REFERENCE TO RELATED APPLICATIONS

This application is a continuation of International Application No. PCT/CN2020/092320, filed on May 26, 2020, which claims priority to Chinese Patent Application No. 201910626171.8, filed on Jul. 11, 2019. The disclosures of the aforementioned applications are hereby incorporated by reference in their entireties.

TECHNICAL FIELD

The embodiments relate to the field of image processing and an image processing method and apparatus.

BACKGROUND

A dynamic range (DR) may be used to represent a ratio of a maximum grayscale value to a minimum grayscale value of a picture. The dynamic range may be further used to represent a ratio of a maximum luminance value to a minimum luminance value of the picture. A dynamic range in the real world between $10^{-3}$ and $10^6$ may be referred to as a high dynamic range (HDR). In other words, luminance values of things in the real world may be very large or very small. However, a display capability of a display device is generally limited. For example, luminance of a thing A in the real world is relatively high. For example, the luminance of the thing A is 2000 nits, wherein a "nit" is also known as a candela per square meter. However, the maximum luminance that can be displayed by the display device may be lower than the luminance of the thing A. For example, the maximum luminance that can be displayed by the display device is only 500 nits. If no processing is performed, the display device is unable to reproduce the thing A in the real world. In another case, luminance of a thing B in the real world is relatively low. For example, a luminance value of the thing B is 10 nits. However, the minimum luminance that can be displayed by the display device is higher than the luminance of the thing B. For example, the minimum luminance that can be displayed by the display device is only 100 nits. If no processing is performed, the display device is unable to reproduce the thing B in the real world. The embodiments provide a method to enable a display device to vividly and realistically reproduce a scene in a real world.

SUMMARY

The embodiments provide an image processing method and apparatus to enable a display device to vividly and realistically reproduce a scene in a real world.

According to a first aspect, an image processing method is provided and includes: obtaining a target picture and an initial tone mapping curve of the target picture; determining a plurality of interpolation points based on luminance information and/or dynamic metadata of the target picture; determining a spline function that passes through the plurality of interpolation points, where the spline function is smoothly connected to the initial tone mapping curve at at least one of the plurality of interpolation points; modifying the initial tone mapping curve based on the spline function, to obtain a modified tone mapping curve of the target picture; and performing tone mapping on the target picture based on the modified tone mapping curve.

The determining a plurality of interpolation points based on luminance information and/or dynamic metadata of the target picture may be determining, based on the luminance information and/or dynamic metadata of the target picture, a modification interval for modifying the initial tone mapping curve; the determining a spline function that passes through the plurality of interpolation points may be determining, in the modification interval, a spline function for modifying the initial tone mapping curve; and the modifying the initial tone mapping curve based on the spline function, to obtain a modified tone mapping curve of the target picture may be modifying, in the modification interval, the initial tone mapping curve to the spline function, to obtain the modified tone mapping curve of the target picture.

The embodiments provide a method for modifying an obtained initial tone mapping curve, so that a manner of obtaining the tone mapping curve is more flexible. By analyzing luminance of the target picture and modifying the tone mapping curve properly, an image display can be adjusted for different luminance regions, and luminance change details of the image can be enhanced, thereby bringing better visual experience to a user. By finely adjusting the tone mapping curve in various forms, a plurality of styles of display such as gentle, vivid, bright, and dark can be obtained. For example, a form of the tone mapping curve may be flexibly determined based on device attributes of the display device and a photographing device, so that image displaying is more vivid and natural. In addition, in a process of displaying a video, a tone mapping curve of a frame may be determined, and for a frame adjacent to the frame, a parameter for modifying the tone mapping curve is determined, so that a video display can be improved without adding excessive data.

With reference to the first aspect, in some implementations of the first aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, a quantity of dark region pixels included in the target picture is greater than or equal to a second preset threshold, luminance values of the dark region pixels are less than a first preset threshold, the plurality of interpolation points include a first interpolation point, and the determining a plurality of interpolation points based on luminance information of the target picture includes: determining that a first coordinate value of the first interpolation point is the same as a first coordinate value of the first endpoint.

In this embodiment, when the image is dark, an electronic device may determine that an interpolation point exists at the first endpoint or a position close to the first endpoint, thereby improving a display of a dark region. Therefore, a modification position for modifying the initial tone mapping curve may be determined based on a luminance degree of the image, so that pixels whose luminance is lower than a display capability of the display device can be displayed on the display device.

With reference to the first aspect, in some implementations of the first aspect, the plurality of interpolation points further include a second interpolation point, and the determining a plurality of interpolation points based on luminance information of the target picture includes: determining a first coordinate value of the second interpolation point based on the quantity of the dark region pixels.

In this embodiment, when the image is dark, the electronic device may determine a modification range of the initial tone mapping curve based on an area of a dark region in the target image, so that pixels whose luminance is lower than the display capability of the display device can have a relatively good display.

With reference to the first aspect, in some implementations of the first aspect, the plurality of interpolation points further include a third interpolation point, the target picture further includes dark region transition pixels, luminance values of the dark region transition pixels are greater than or equal to the first preset threshold, and the determining a plurality of interpolation points based on luminance information of the target picture includes: determining a first coordinate value of the third interpolation point based on a quantity of the dark region transition pixels.

The third interpolation point may be a transition point, so that the spline function and the initial tone mapping curve transition smoothly at the third interpolation point. In this embodiment, when the image is dark, one end of the initial tone mapping curve may be modified. To ensure that the modified tone mapping curve is smooth, that is, to ensure an image display, an interpolation point with a smooth connection may be determined, so that the spline function is smoothly connected to the initial tone mapping curve.

With reference to the first aspect, in some implementations of the first aspect, the initial tone mapping curve passes through the third interpolation point, and the determining a spline function that passes through the plurality of interpolation points includes: obtaining a first spline function that passes through the first interpolation point and the second interpolation point; and determining a second spline function that passes through the second interpolation point and the third interpolation point, where the second spline function is smoothly connected to the first spline function at the second interpolation point, and the second spline function is smoothly connected to the initial tone mapping curve at the third interpolation point.

With reference to the first aspect, in some implementations of the first aspect, the first spline function is a linear spline function and the second spline function is a cubic spline function.

With reference to the first aspect, in some implementations of the first aspect, the spline function includes a third spline function that passes through the first interpolation point, the second interpolation point, and the third interpolation point. For example, the third spline function is a cubic spline function.

With reference to the first aspect, in some implementations of the first aspect, the method includes: obtaining a first offset corresponding to the second interpolation point, where the first offset is used to represent a modification range of the initial tone mapping curve at a first modification position, and the first modification position is the first coordinate value of the second interpolation point; and determining a second coordinate value of the second interpolation point based on a function value of the initial tone mapping curve at the first modification position and the first offset; and the determining a spline function that passes through the plurality of interpolation points includes: determining the third spline function based on the first coordinate value of the second interpolation point and the second coordinate value of the second interpolation point, where the third spline function is smoothly connected to the initial tone mapping curve at the third interpolation point.

With reference to the first aspect, in some implementations of the first aspect, the third spline function includes a fourth spline function that passes through the first interpolation point and the second interpolation point, and a fifth spline function that passes through the second interpolation point and the third interpolation point, and a second-order derivative value of the fourth spline function at the second interpolation point is the same as a second-order derivative value of the fifth spline function at the second interpolation point.

For example, the third spline function is a cubic spline function.

For example, a derivative of the spline function in the foregoing scenario is always greater than 0.

With reference to the first aspect, in some implementations of the first aspect, the plurality of interpolation points further include an eleventh interpolation point, and a second-order derivative of the spline function at the eleventh interpolation point is 0.

With reference to the first aspect, in some implementations of the first aspect, the initial tone mapping curve includes the first endpoint and the second endpoint, the first endpoint and the second endpoint are respectively located at the two ends of the initial tone mapping curve, the luminance value corresponding to the first endpoint is less than the luminance value corresponding to the second endpoint, a quantity of bright region pixels included in the target picture is greater than or equal to a fourth preset threshold, luminance values of the bright region pixels are greater than a third preset threshold, the plurality of interpolation points include a fourth interpolation point, and the determining a plurality of interpolation points based on luminance information of the target picture includes: determining that a first coordinate value of the fourth interpolation point is the same as a first coordinate value of the second endpoint.

In this embodiment, when the image is bright, the electronic device may determine that an interpolation point exists at the second endpoint or a position close to the second endpoint, thereby improving display of a bright region. Therefore, a modification position for modifying the initial tone mapping curve may be determined based on a luminance degree of the image, so that pixels whose luminance is higher than a display capability of the display device can be displayed on the display device.

With reference to the first aspect, in some implementations of the first aspect, the plurality of interpolation points further include a fifth interpolation point, and the determining a plurality of interpolation points based on luminance information of the target picture includes: determining a first coordinate value of the fifth interpolation point based on the quantity of the bright region pixels.

In this embodiment, when the image is bright, the electronic device may determine, based on an area of a bright region in the target image, a modification range for modifying the initial tone mapping curve, so that pixels whose luminance is higher than the display capability of the display device can have a relatively good display.

With reference to the first aspect, in some implementations of the first aspect, the plurality of interpolation points further include a sixth interpolation point, the target picture further includes bright region transition pixels, luminance values of the bright region transition pixels are less than or equal to the third preset threshold, and the determining a plurality of interpolation points based on luminance information of the target picture includes: determining a first coordinate value of the sixth interpolation point based on a quantity of the bright region transition pixels.

The sixth interpolation point may be a transition point, so that the spline function and the initial tone mapping curve transition smoothly at the sixth interpolation point. In this embodiment, when the image is bright, one end of the initial tone mapping curve may be modified. To ensure that the modified tone mapping curve is smooth, that is, to ensure an image display, an interpolation point with a smooth connection may be determined, so that the spline function is smoothly connected to the initial tone mapping curve.

With reference to the first aspect, in some implementations of the first aspect, the initial tone mapping curve passes through the sixth interpolation point, and the determining a spline function that passes through the plurality of interpolation points includes: obtaining a first spline function that passes through the fourth interpolation point and the fifth interpolation point; and determining a second spline function that passes through the fifth interpolation point and the sixth interpolation point, where the second spline function is smoothly connected to the first spline function at the fifth interpolation point, and the second spline function is smoothly connected to the initial tone mapping curve at the sixth interpolation point.

With reference to the first aspect, in some implementations of the first aspect, the first spline function is a linear spline function and the second spline function is a cubic spline function.

With reference to the first aspect, in some implementations of the first aspect, the spline function includes a third spline function that passes through the fourth interpolation point, the fifth interpolation point, and the sixth interpolation point. For example, the third spline function is a cubic spline function.

With reference to the first aspect, in some implementations of the first aspect, the method includes: obtaining a first offset corresponding to the fifth interpolation point, where the first offset is used to represent a modification range of the initial tone mapping curve at a first modification position, and the first modification position is the first coordinate value of the fifth interpolation point; and determining a second coordinate value of the fifth interpolation point based on a function value of the initial tone mapping curve at the first modification position and the first offset; and the determining a spline function that passes through the plurality of interpolation points includes: determining the third spline function based on the first coordinate value of the fifth interpolation point and the second coordinate value of the fifth interpolation point, where the third spline function is smoothly connected to the initial tone mapping curve at the sixth interpolation point.

With reference to the first aspect, in some implementations of the first aspect, the third spline function includes a fourth spline function that passes through the fourth interpolation point and the fifth interpolation point, and a fifth spline function that passes through the fifth interpolation point and the sixth interpolation point, and a second-order derivative value of the fourth spline function at the fifth interpolation point is the same as a second-order derivative value of the fifth spline function at the fifth interpolation point. With reference to the first aspect, in some implementations of the first aspect, the dynamic metadata includes at least one of the following items: coordinate information of each of the plurality of interpolation points, region luminance indication information, or coordinate information of a plurality of key pixels.

With reference to the first aspect, in some implementations of the first aspect, the dynamic metadata includes coordinate information of each of the plurality of interpolation points.

In this embodiment, interpolation point information may be preset in the dynamic metadata, so that an image processing apparatus may not analyze pixels of the image and may determine the plurality of interpolation points only based on the dynamic metadata, thereby reducing a calculation amount of image processing.

With reference to the first aspect, in some implementations of the first aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, and the dynamic metadata includes region luminance indication information; and when the region luminance indication information indicates a dark region, the plurality of interpolation points include a first interpolation point, and a first coordinate value of the first interpolation point is the same as a first coordinate value of the first endpoint; and/or when the region luminance indication information indicates a bright region, the plurality of interpolation points include a second interpolation point, and a first coordinate value of the second interpolation point is the same as a first coordinate value of the second endpoint.

In this embodiment, when the image is dark, the electronic device may determine that an interpolation point exists at the first endpoint or a position close to the first endpoint. Therefore, a modification position for modifying the initial tone mapping curve may be determined based on a luminance degree of the image, so that pixels whose luminance is lower than a display capability of the display device can be displayed on the display device. When the image is bright, the electronic device may determine that an interpolation point exists at the second endpoint or a position close to the second endpoint. Therefore, a modification position for modifying the initial tone mapping curve may be determined based on a luminance degree of the image, so that pixels whose luminance is higher than a display capability of the display device can be displayed on the display device. Because the dynamic metadata specifies "dark" or "bright", the image processing apparatus may not analyze pixels of the image but may determine the plurality of interpolation points only based on the dynamic metadata, thereby reducing a calculation amount of image processing.

With reference to the first aspect, in some implementations of the first aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, the dynamic metadata includes P pieces of coordinate information in a one-to-one correspondence with P key pixels, P is a positive integer, and the determining a plurality of interpolation points based on luminance information and dynamic metadata of the target picture includes: determining, based on the P pieces of coordinate information and the luminance information of the target picture, that the P key pixels are dark region pixels or bright region pixels, where luminance values of the dark region pixels are less than a first preset threshold, and luminance values of the bright region pixels are greater than a third preset threshold; and when the P key pixels are the dark region pixels, determining that the plurality of interpolation points include a first interpolation point, where a first coordinate value of the first interpolation point is the same as a first coordinate value of the first endpoint; or when the P key pixels are the bright region pixels, determining that the plurality of interpolation points include a second interpolation point, where a first coordinate value of the second interpolation point is the same as a first coordinate value of the second endpoint.

In this embodiment, when the image is dark, the electronic device may determine that an interpolation point exists at the first endpoint or a position close to the first endpoint. Therefore, a modification position for modifying the initial tone mapping curve may be determined based on a luminance degree of the image, so that pixels whose luminance is lower than a display capability of the display device can be displayed on the display device. When the image is bright, the electronic device may determine that an interpolation point exists at the second endpoint or a position close to the second endpoint. Therefore, a modification position for modifying the initial tone mapping curve may be determined based on a luminance degree of the image, so that pixels whose luminance is higher than a display capability of the display device can be displayed on the display device. Because the dynamic metadata specifies the pixels, the image processing apparatus does not need to determine target pixels when performing scene analysis on the target picture, but directly determines dark region pixels and bright region pixels of the picture based on the target pixels specified by the dynamic metadata. Therefore, a key protected region and a plurality of corresponding interpolation points can be determined more flexibly, and a calculation amount of image processing is reduced.

With reference to the first aspect, in some implementations of the first aspect, the target picture includes target pixels whose luminance values are between a first luminance value and a second luminance value, a proportion of the target pixels to all pixels of the target picture is greater than an eighth preset threshold, a difference between the first luminance value and the second luminance value is less than a seventh preset threshold, the plurality of interpolation points include a twelfth interpolation point, and the determining a plurality of interpolation points based on luminance information of the target picture includes: determining the twelfth interpolation point based on average luminance of the target pixels, a minimum luminance value of the target picture, and a maximum luminance value of the target picture.

A first coordinate value of the twelfth interpolation point may be greater than the first coordinate value of the foregoing first interpolation point.

The first coordinate value of the twelfth interpolation point may be greater than the first coordinate value of the foregoing second interpolation point.

The first coordinate value of the twelfth interpolation point may be greater than the first coordinate value of the foregoing third interpolation point.

The first coordinate value of the twelfth interpolation point may be less than the first coordinate value of the foregoing fourth interpolation point.

The first coordinate value of the twelfth interpolation point may be less than the first coordinate value of the foregoing fifth interpolation point.

The first coordinate value of the twelfth interpolation point may be less than the first coordinate value of the foregoing sixth interpolation point.

In this embodiment, a modification range may be determined on an initial tone mapping function based on a luminance interval in which a to-be-modified pixel is located. In other words, a modification may be performed on any segment of the initial tone mapping function, and modification flexibility is relatively high. However, when the luminance interval is relatively narrow, a luminance contrast of the image is not obvious. The initial tone mapping curve is modified, so that the image whose original luminance contrast is not obvious can be displayed on the electronic device more vividly.

With reference to the first aspect, in some implementations of the first aspect, the plurality of interpolation points further include a thirteenth interpolation point, and the determining a plurality of interpolation points based on luminance information of the target picture includes: determining the thirteenth interpolation point based on a quantity of the target pixels.

In this embodiment, a modification range may be determined based on a quantity of to-be-modified pixels, so that the image whose original luminance contrast is not obvious is displayed on the electronic device more vividly.

With reference to the first aspect, in some implementations of the first aspect, the plurality of interpolation points further include a fourteenth interpolation point, the target picture further includes target transition pixels, luminance values of the target transition pixels are less than or equal to the first luminance value, or luminance values of the target transition pixels are greater than or equal to the second luminance value, the first luminance value is less than the second luminance value, and the determining a plurality of interpolation points based on luminance information of the target picture includes: determining a first coordinate value of the fourteenth interpolation point based on a quantity of the target transition pixels.

In an example, the first coordinate value of the fourteenth interpolation point is greater than the first coordinate value of the twelfth interpolation point and greater than a first coordinate value of the thirteenth interpolation point.

In an example, the first coordinate value of the fourteenth interpolation point is less than the first coordinate value of the twelfth interpolation point and less than the first coordinate value of the thirteenth interpolation point.

The fourteenth interpolation point may be a transition point, so that the spline function and the initial tone mapping curve transition smoothly at the fourteenth interpolation point. In this embodiment, to ensure that the modified tone mapping curve is smooth, that is, to ensure an image display, an interpolation point with a smooth connection effect may be determined, so that the spline function is smoothly connected to the initial tone mapping curve.

With reference to the first aspect, in some implementations of the first aspect, the initial tone mapping curve passes through the fourteenth interpolation point, and the determining a spline function that passes through the plurality of interpolation points includes: obtaining a first spline function that passes through the twelfth interpolation point and the thirteenth interpolation point; and determining a second spline function that passes through the thirteenth interpolation point and the fourteenth interpolation point, where the second spline function is smoothly connected to the first spline function at the thirteenth interpolation point, and the second spline function is smoothly connected to the initial tone mapping curve at the fourteenth interpolation point.

With reference to the first aspect, in some implementations of the first aspect, the first spline function is a linear spline function and the second spline function is a cubic spline function.

With reference to the first aspect, in some implementations of the first aspect, the spline function includes a third spline function that passes through the twelfth interpolation point, the thirteenth interpolation point, and the fourteenth interpolation point, and the first coordinate value of the thirteenth interpolation point is between the first coordinate value of the twelfth interpolation point and the first coordinate value of the fourteenth interpolation point; before the determining a plurality of interpolation points, the method further includes: obtaining a first offset, where the first offset is used to represent a modification range of the initial tone mapping curve at a first modification position, and the first modification position is the first coordinate value of the thirteenth interpolation point; the determining a plurality of interpolation points includes: determining a second coordinate value of the thirteenth interpolation point based on a function value of the initial tone mapping curve at the first modification position and the first offset; and the determining a spline function that passes through the plurality of interpolation points includes: determining the third spline function based on the first coordinate value of the thirteenth interpolation point and the second coordinate value of the thirteenth interpolation point, where the third spline function is smoothly connected to the initial tone mapping curve at the twelfth interpolation point and/or the fourteenth interpolation point.

With reference to the first aspect, in some implementations of the first aspect, the plurality of interpolation points include a seventh interpolation point, an eighth interpolation point, and a ninth interpolation point, the initial tone mapping curve passes through the ninth interpolation point, and the determining a spline function that passes through the plurality of interpolation points includes: obtaining a first spline function that passes through the seventh interpolation point and the eighth interpolation point; and determining a second spline function that passes through the eighth interpolation point and the ninth interpolation point, where the second spline function is smoothly connected to the first spline function at the eighth interpolation point, and the second spline function is smoothly connected to the initial tone mapping curve at the ninth interpolation point.

In an example, the seventh interpolation point may be the foregoing first interpolation point, the eighth interpolation point may be the foregoing second interpolation point, and the ninth interpolation point may be the foregoing third interpolation point.

In an example, the seventh interpolation point may be the foregoing fourth interpolation point, the eighth interpolation point may be the foregoing fifth interpolation point, and the ninth interpolation point may be the foregoing sixth interpolation point.

In an example, the eighth interpolation point may be the foregoing twelfth interpolation point, the seventh interpolation point may be the foregoing fourteenth interpolation point whose first coordinate value is less than the first coordinate value of the twelfth interpolation point and less than the first coordinate value of the thirteenth interpolation point, and the ninth interpolation point may be the foregoing fourteenth interpolation point whose first coordinate value is greater than the first coordinate value of the twelfth interpolation point and greater than the first coordinate value of the thirteenth interpolation point.

In this embodiment, an empirical value of the first spline function is obtained in advance, so that a modification within a key modification range can be ensured; and the second spline function is used to achieve a weak modification and a smooth connection within a weak modification range.

With reference to the first aspect, in some implementations of the first aspect, the first spline function is a linear spline function and the second spline function is a cubic spline function.

In this embodiment, because a parameter of the first spline function is an empirical value, and fewer empirical values need to be learned in advance for the linear spline function, it is easier to determine a specific form of the first spline function. When a power of the second spline function is relatively low, a smooth connection of the second spline function is relatively poor. When the power of the second spline function is relatively high, a precondition and a calculation amount of the second spline function are relatively large. Therefore, it is more appropriate to choose a cubic spline function for the second spline function.

With reference to the first aspect, in some implementations of the first aspect, the plurality of interpolation points include a seventh interpolation point, an eighth interpolation point, and a ninth interpolation point, the spline function includes a third spline function that passes through the seventh interpolation point, the eighth interpolation point, and the ninth interpolation point, and a first coordinate value of the eighth interpolation point is between a first coordinate value of the seventh interpolation point and a first coordinate value of the ninth interpolation point; before the determining a plurality of interpolation points, the method further includes: obtaining a first offset, where the first offset is used to represent a modification range of the initial tone mapping curve at a first modification position, and the first modification position is the first coordinate value of the eighth interpolation point; the determining a plurality of interpolation points includes: determining a second coordinate value of the eighth interpolation point based on a function value of the initial tone mapping curve at the first modification position and the first offset; and determining the spline function that passes through the plurality of interpolation points includes: determining the third spline function based on the first coordinate value of the eighth interpolation point and the second coordinate value of the eighth interpolation point, where the third spline function is smoothly connected to the initial tone mapping curve at the seventh interpolation point and/or the ninth interpolation point.

In an example, the seventh interpolation point may be the foregoing first interpolation point, the eighth interpolation point may be the foregoing second interpolation point, and the ninth interpolation point may be the foregoing third interpolation point.

In an example, the seventh interpolation point may be the foregoing fourth interpolation point, the eighth interpolation point may be the foregoing fifth interpolation point, and the ninth interpolation point may be the foregoing sixth interpolation point.

In an example, the seventh interpolation point may be the foregoing twelfth interpolation point, the eighth interpolation point may be the foregoing thirteenth interpolation point, and the ninth interpolation point may be the foregoing fourteenth interpolation point.

In this embodiment, an empirical value of the first offset is obtained in advance, so that a modification within a key modification range can be ensured; and the third spline function may be used to achieve a weak modification and a smooth connection within a weak modification range.

With reference to the first aspect, in some implementations of the first aspect, the third spline function includes a fourth spline function that passes through the seventh interpolation point and the eighth interpolation point, and a fifth spline function that passes through the eighth interpolation point and the ninth interpolation point, and a second-order derivative value of the fourth spline function at the eighth interpolation point is the same as a second-order derivative value of the fifth spline function at the eighth interpolation point.

With reference to the first aspect, in some implementations of the first aspect, the plurality of interpolation points further include a tenth interpolation point, the third spline function passes through the tenth interpolation point, and a first coordinate value of the tenth interpolation point is between the first coordinate value of the seventh interpolation point and the first coordinate value of the ninth interpolation point; before the determining a plurality of interpolation points, the method further includes: obtaining a second offset, where the second offset is used to represent a modification range of the initial tone mapping curve at a second modification position, and the second modification position is the first coordinate value of the tenth interpolation point; determining the plurality of interpolation points further includes: determining a second coordinate value of the tenth interpolation point based on a function value of the initial tone mapping curve at the second modification position and the second offset; and the determining the third spline function based on the first coordinate value of the eighth interpolation point and the second coordinate value of the eighth interpolation point includes: determining the third spline function based on the first coordinate value and the second coordinate value of the eighth interpolation point, and the first coordinate value and the second coordinate value of the tenth interpolation point, where the third spline function is smoothly connected to the initial tone mapping curve at both the seventh interpolation point and the ninth interpolation point.

In this embodiment, empirical values of the first offset and the second offset are obtained in advance, so that a modification within a key modification range is controlled. In addition, the third spline function may achieve a weak modification and a smooth connection within a weak modification range.

With reference to the first aspect, in some implementations of the first aspect, the third spline function is a cubic spline function.

In this embodiment, when a power of the third spline function is relatively low, a smooth connection of the third spline function is relatively poor. When the power of the third spline function is relatively high, a precondition and a calculation amount of the third spline function are relatively large. Therefore, it is more appropriate to choose a cubic spline function for the third spline function.

With reference to the first aspect, in some implementations of the first aspect, a derivative of the spline function is always greater than 0.

In this embodiment, a restriction that a derivative at any point is greater than 0 may be used to avoid an excessively large difference between a finally obtained spline function and the initial tone mapping curve, for example, occurrence of an oscillating spline function, and avoid an excessive modification.

With reference to the first aspect, in some implementations of the first aspect, the plurality of interpolation points further include an eleventh interpolation point, and a second-order derivative of the spline function at the eleventh interpolation point is 0.

In this embodiment, by restricting the second-order derivative of the eleventh interpolation point to 0, the spline function may be controlled to rapidly increase on one side of the eleventh interpolation point and increase at a reduced speed on the other side of the eleventh interpolation point.

With reference to the first aspect, in some implementations of the first aspect, the plurality of interpolation points further include a fifteenth interpolation point, the spline function is higher than the initial tone mapping function on one side of the fifteenth interpolation point, and the spline function is lower than the initial tone mapping function on the other side of the fifteenth interpolation point.

In this embodiment, the spline function passes through the fifteenth interpolation point, the initial tone mapping function passes through the fifteenth interpolation point, and a derivative value of the spline function at the fifteenth interpolation point is different from a derivative value of the initial tone mapping function at the fifteenth interpolation point. By defining a location of the fifteenth interpolation point, a modification manner of the initial tone mapping function may be defined.

With reference to the first aspect, in some implementations of the first aspect, the initial tone mapping curve includes one of the following formulas:

$$L' = a \times \left(\frac{p \times L}{(p-1) \times L + 1}\right)^m + b;$$

$$L' = a \times L + b;$$

$$L' = \frac{c_1 + c_2 \times L^n}{1 + c_3 \times L^n}; \text{ and}$$

$$L' \sum_{p=0}^{N} \binom{N}{\rho} \times L^\rho \times (1-L)^{N-\rho} \times P_\rho,$$

where L represents a linear signal value, L' represents a nonlinear signal value, p, a, m, b, $c_1$, $c_2$, $c_3$, n, N, and $\rho$ are all dynamic range mapping coefficients, and $0 \leq L \leq 1$.

In this embodiment, the method provided in the first aspect may be applied to a plurality of initial tone mapping curves and has high flexibility.

According to a second aspect, an image processing apparatus is provided and includes: an obtaining module, configured to obtain a target picture and an initial tone mapping curve of the target picture; a processing module, configured to determine a plurality of interpolation points based on luminance information and/or dynamic metadata of the target picture, where the processing module is further configured to determine a spline function that passes through the plurality of interpolation points, where the spline function is smoothly connected to the initial tone mapping curve at at least one of the plurality of interpolation points; and the processing module is further configured to modify the initial tone mapping curve based on the spline function, to obtain a modified tone mapping curve of the target picture; and a tone mapping module, configured to perform tone mapping on the target picture based on the modified tone mapping curve.

With reference to the second aspect, in some implementations of the second aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, a quantity of dark region pixels included in the target picture is greater than or equal to a second preset threshold, luminance values of the dark region pixels are less than a first preset threshold, and the plurality of interpolation points include a first interpolation point; and the processing module is configured to determine that a first coordinate value of the first interpolation point is the same as a first coordinate value of the first endpoint.

With reference to the second aspect, in some implementations of the second aspect, the plurality of interpolation points further include a second interpolation point; and the processing module is configured to determine a first coordinate value of the second interpolation point based on the quantity of the dark region pixels.

With reference to the second aspect, in some implementations of the second aspect, the plurality of interpolation points further include a third interpolation point, the target picture further includes dark region transition pixels, and luminance values of the dark region transition pixels are greater than or equal to the first preset threshold; and the processing module is configured to determine a first coordinate value of the third interpolation point based on a quantity of the dark region transition pixels.

With reference to the second aspect, in some implementations of the second aspect, the initial tone mapping curve includes the first endpoint and the second endpoint, the first endpoint and the second endpoint are respectively located at the two ends of the initial tone mapping curve, the luminance value corresponding to the first endpoint is less than the luminance value corresponding to the second endpoint, a quantity of bright region pixels included in the target picture is greater than or equal to a fourth preset threshold, luminance values of the bright region pixels are greater than a third preset threshold, and the plurality of interpolation points include a fourth interpolation point; and the processing module is configured to determine that a first coordinate value of the fourth interpolation point is the same as a first coordinate value of the second endpoint.

With reference to the second aspect, in some implementations of the second aspect, the plurality of interpolation points further include a fifth interpolation point; and the processing module is configured to determine a first coordinate value of the fifth interpolation point based on the quantity of the bright region pixels.

With reference to the second aspect, in some implementations of the second aspect, the plurality of interpolation points further include a sixth interpolation point, the target picture further includes bright region transition pixels, and luminance values of the bright region transition pixels are less than or equal to the third preset threshold; and the processing module is configured to determine a first coordinate value of the sixth interpolation point based on a quantity of the bright region transition pixels.

With reference to the second aspect, in some implementations of the second aspect, the dynamic metadata includes coordinate information of each of the plurality of interpolation points.

With reference to the second aspect, in some implementations of the second aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, and the dynamic metadata includes region luminance indication information; and when the region luminance indication information indicates a dark region, the plurality of interpolation points include a first interpolation point, and a first coordinate value of the first interpolation point is the same as a first coordinate value of the first endpoint; and/or when the region luminance indication information indicates a bright region, the plurality of interpolation points include a second interpolation point, and a first coordinate value of the second interpolation point is the same as a first coordinate value of the second endpoint.

With reference to the second aspect, in some implementations of the second aspect, the initial tone mapping curve includes a first endpoint and a second endpoint, the first endpoint and the second endpoint are respectively located at two ends of the initial tone mapping curve, a luminance value corresponding to the first endpoint is less than a luminance value corresponding to the second endpoint, the dynamic metadata includes P pieces of coordinate information in a one-to-one correspondence with P key pixels, and P is a positive integer; the processing module is configured to determine, based on the P pieces of coordinate information and the luminance information of the target picture, that the P key pixels are dark region pixels or bright region pixels, where luminance values of the dark region pixels are less than a first preset threshold, and luminance values of the bright region pixels are greater than a third preset threshold; and when the P key pixels are the dark region pixels, the processing module is configured to determine that the plurality of interpolation points include a first interpolation point, where a first coordinate value of the first interpolation point is the same as a first coordinate value of the first endpoint; or when the P key pixels are the bright region pixels, the processing module is configured to determine that the plurality of interpolation points include a second interpolation point, where a first coordinate value of the second interpolation point is the same as a first coordinate value of the second endpoint.

With reference to the second aspect, in some implementations of the second aspect, the plurality of interpolation points include a seventh interpolation point, an eighth interpolation point, and a ninth interpolation point, and the initial tone mapping curve passes through the ninth interpolation point; the processing module is configured to obtain a first spline function that passes through the seventh interpolation point and the eighth interpolation point; and the processing module is configured to determine a second spline function that passes through the eighth interpolation point and the ninth interpolation point, where the second spline function is smoothly connected to the first spline function at the eighth interpolation point, and the second spline function is smoothly connected to the initial tone mapping curve at the ninth interpolation point.

With reference to the second aspect, in some implementations of the second aspect, the first spline function is a linear spline function and the second spline function is a cubic spline function.

With reference to the second aspect, in some implementations of the second aspect, the plurality of interpolation points include a seventh interpolation point, an eighth interpolation point, and a ninth interpolation point, the spline function includes a third spline function that passes through the seventh interpolation point, the eighth interpolation point, and the ninth interpolation point, and a first coordinate value of the eighth interpolation point is between a first coordinate value of the seventh interpolation point and a first coordinate value of the ninth interpolation point; before the processing module determines the plurality of interpolation points, the obtaining module is further configured to obtain a first offset, where the first offset is used to represent a modification range of the initial tone mapping curve at a first modification position, and the first modification position is the first coordinate value of the eighth interpolation point; the processing module is configured to determine a second coordinate value of the eighth interpolation point based on a function value of the initial tone mapping curve at the first modification position and the first offset; and the processing module is configured to determine the third spline function based on the first coordinate value of the eighth interpolation point and the second coordinate value of the eighth interpolation point, where the third spline function is smoothly connected to the initial tone mapping curve at the seventh interpolation point and/or the ninth interpolation point.

With reference to the second aspect, in some implementations of the second aspect, the third spline function includes a fourth spline function that passes through the seventh interpolation point and the eighth interpolation point, and a fifth spline function that passes through the eighth interpolation point and the ninth interpolation point, and a second-order derivative value of the fourth spline function at the eighth interpolation point is the same as a second-order derivative value of the fifth spline function at the eighth interpolation point.

With reference to the second aspect, in some implementations of the second aspect, the plurality of interpolation points further include a tenth interpolation point, the third spline function passes through the tenth interpolation point, and a first coordinate value of the tenth interpolation point is between the first coordinate value of the seventh interpolation point and the first coordinate value of the ninth interpolation point; before the processing module determines the plurality of interpolation points, the obtaining module is further configured to obtain a second offset, where the second offset is used to represent a modification range of the initial tone mapping curve at a second modification position, and the second modification position is the first coordinate value of the tenth interpolation point; the processing module is configured to determine a second coordinate value of the tenth interpolation point based on a function value of the initial tone mapping curve at the second modification position and the second offset; and the processing module is configured to determine the third spline function based on the first coordinate value and the second coordinate value of the eighth interpolation point, and the first coordinate value and the second coordinate value of the tenth interpolation point, where the third spline function is smoothly connected to the initial tone mapping curve at both the seventh interpolation point and the ninth interpolation point.

With reference to the second aspect, in some implementations of the second aspect, the third spline function is a cubic spline function.

With reference to the second aspect, in some implementations of the second aspect, a derivative of the spline function is always greater than 0.

With reference to the second aspect, in some implementations of the second aspect, the plurality of interpolation points further include an eleventh interpolation point, and a second-order derivative of the spline function at the eleventh interpolation point is 0.

With reference to the second aspect, in some implementations of the second aspect, the initial tone mapping curve includes one of the following formulas:

$$L' = a \times \left(\frac{p \times L}{(p-1) \times L + 1}\right)^m + b;$$

$$L' = a \times L + b;$$

$$L' = \frac{c_1 + c_2 \times L^n}{1 + c_3 \times L^n}; \text{ and}$$

$$L' \sum_{\rho=0}^{N} \binom{N}{\rho} \times L^\rho \times (1-L)^{N-\rho} \times P_\rho,$$

where L represents a linear signal value, L' represents a nonlinear signal value, p, a, m, b, $c_1$, $c_2$, $c_3$, n, N, and ρ are all dynamic range mapping coefficients, and $0 \leq L \leq 1$.

According to a third aspect, the embodiments provide an image processing apparatus, including a module configured to perform any one of the first aspect or the implementations of the first aspect.

According to a fourth aspect, the embodiments provide an image processing apparatus, including a processor and a transmission interface, where the transmission interface is configured to receive or send image data; and the processor is configured to invoke program instructions stored in a memory, and execute the program instructions to perform the method according to any one of the first aspect or the implementations of the first aspect.

In a possible implementation, the image processing apparatus may further include the memory.

For example, the image processing apparatus may be a chip.

According to a fifth aspect, the embodiments provide an electronic device, including a processor and a memory, configured to perform the method according to any one of the first aspect or the implementations of the first aspect.

According to a sixth aspect, the embodiments provide a computer-readable storage medium, where the computer-readable storage medium stores program instructions, and when the program instructions are run on a computer or a processor, the computer or the processor is enabled to perform the method according to any one of the first aspect or the implementations of the first aspect.

According to a seventh aspect, the embodiments provide a computer program product, including a computer program, where when the computer program is executed on a computer or a processor, the computer or the processor is enabled to perform the method according to any one of the first aspect or the implementations of the first aspect.

DESCRIPTION OF EMBODIMENTS

The following describes solutions with reference to accompanying drawings.

In embodiments, an electronic device includes a hardware layer, an operating system layer running above the hardware layer, and an application layer running above the operating system layer. The hardware layer includes hardware such as a central processing unit (CPU), a memory management unit (MMU), and a memory (also referred to as a main memory). An operating system may be any computer operating system that implements service processing through a process, for example, a Linux operating system, a Unix operating system, an Android operating system, an iOS operating system, or a Windows operating system. The application layer includes applications such as a browser, an address book, word processing software, and instant messaging software. In addition, a structure of an execution body of a method provided in the embodiments is not limited in the embodiments, provided that a program that records code of the method provided in the embodiments can be run to perform image processing according to the method provided in the embodiments. For example, the method provided in the embodiments may be performed by the electronic device or a functional module that is in the electronic device and that can invoke and execute the program.

In addition, aspects or features may be implemented as a method, an apparatus, or a product that uses standard programming and/or engineering technologies. The term "product" covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), or a smart card and a flash memory component (for example, an erasable programmable read-only memory (EPROM), a card, a stick, or a key drive). In addition, various storage media described may indicate one or more devices and/or other machine-readable media that are configured to store information. The term "machine-readable media" may include but is not limited to a wireless channel and various other media that can store, include, and/or carry instructions and/or data.

Figure 1:
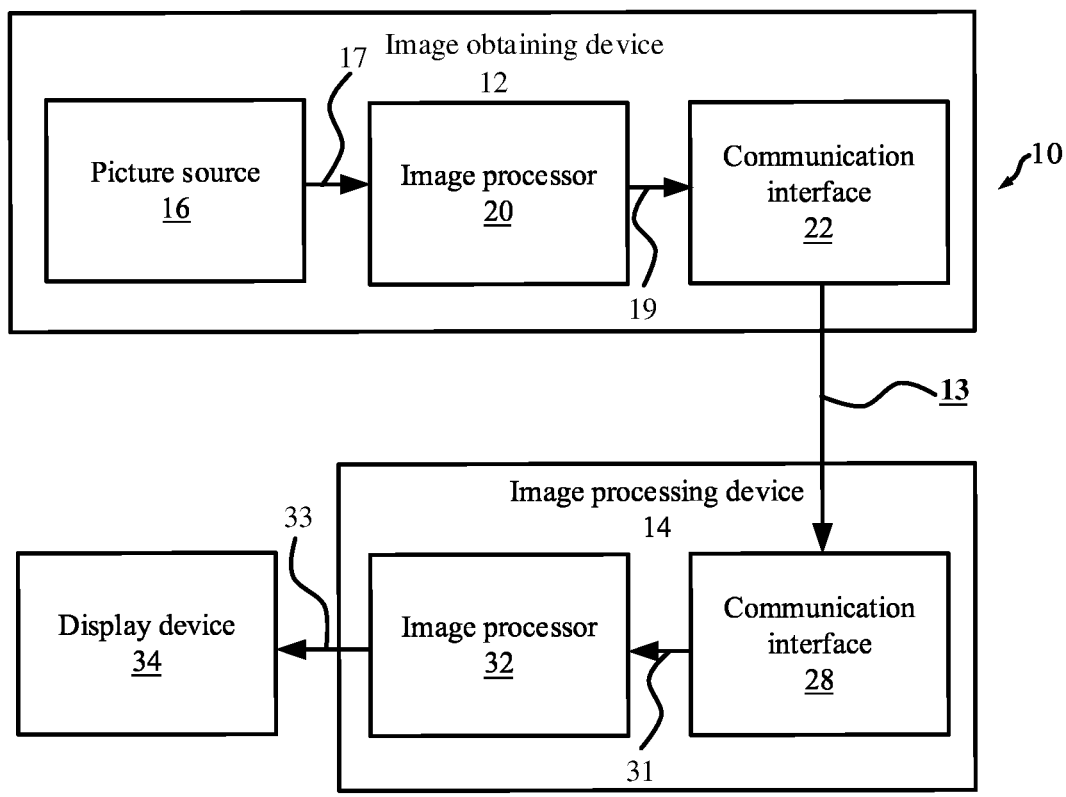
FIG. 1 is a block diagram of an image or video transmission system for implementing an embodiment.

The following describes a system architecture used in the embodiments. FIG. 1 is a schematic block diagram of an exemplary image display system 10 to which an embodiment is applied. As shown in FIG. 1, the image display system 10 may include an image obtaining device 12 and an image processing device 14. The image obtaining device 12 generates a high dynamic range image. The image processing device 14 may process the high dynamic range image generated by the image obtaining device 12. The image obtaining device 12, the image processing device 14, or an image processing apparatus illustrated in each implementation may include one or more processors and a memory coupled to the one or more processors. The memory may include but is not limited to a random access memory (RAM), a read-only memory (ROM), an EEPROM, a flash memory, or any other medium that may be used to store desired program code in a form of an instruction or a data structure accessible by a computer, as described. The image obtaining device 12 and the image processing device 14 may include various apparatuses, including a desktop computer, a mobile computing apparatus, a notebook (for example, a laptop) computer, a tablet computer, a set-top box, a telephone handset such as a so-called "smart" phone, a television, a camera, a display apparatus, a digital media player, a video game console, a vehicle-mounted computer, a wireless communication device, or the like.

Although FIG. 1 depicts the image obtaining device 12 and the image processing device 14 as separate devices, a device embodiment may also include both the image obtaining device 12 and the image processing device 14 or include functions of both the image obtaining device 12 and the image processing device 14, that is, the image obtaining device 12 and the image processing device 14 are two different parts of a same device. For example, the image obtaining device 12 may be a camera in a mobile smartphone, and the image processing device 14 may be a processor in the mobile smartphone. In such an embodiment, the image obtaining device 12 or the corresponding functionality and the image processing device 14 or the corresponding functionality may be implemented by using same hardware and/or software, separate hardware and/or software, or any combination thereof.

The image obtaining device 12 and the image processing device 14 may be communicatively connected by using a link 13. The image processing device 14 may receive a high dynamic range image from the image obtaining device 12 by using the link 13. The link 13 may include one or more media or apparatuses capable of moving the high dynamic range image from the image obtaining device 12 to the image processing device 14. In an example, the link 13 may include one or more communication media that enable the image obtaining device 12 to directly transmit the high dynamic range image to the image processing device 14 in real time. The one or more communication media may include a wireless and/or wired communication medium, for example, a radio frequency (RF) spectrum or one or more physical transmission lines. The one or more communication media may constitute a part of a packet-based network, and the packet-based network is, for example, a local area network, a wide area network, or a global network (for example, the internet). The one or more communication media may include a router, a switch, a base station, or any other device that facilitates communication from the image obtaining device 12 to the image processing device 14.

For example, the image obtaining device 12 includes a picture source 16 and a communication interface 22, which may also be referred to as a transmission interface. In addition, optionally, the image obtaining device 12 may further include an image processor 20. In an exemplary embodiment, the image processor 20, the picture source 16, and the communication interface 22 may be hardware components in the image obtaining device 12 or may be software programs in the image obtaining device 12. Descriptions are separately provided as follows.

The picture source 16 may include or be any type of picture capturing device configured to, for example, capture a real-world picture; and/or any type of device for generating a picture or comment (for screen content coding, some text on a screen is also considered as a part of a to-be-coded picture or image), for example, a computer graphics processing unit configured to generate a computer animation picture; or any type of device configured to obtain and/or provide a real-world picture or a computer animation picture (for example, screen content or a virtual reality (VR) picture); and/or any combination thereof (for example, an augmented reality (AR) picture). The picture source 16 may be a camera configured to capture a picture or a memory configured to store a picture. The picture source 16 may further include any type of (internal or external) interface through which a previously captured or generated picture is stored and/or a picture is obtained or received. When the picture source 16 is a camera, the picture source 16 may be, for example, a local camera or a camera integrated into the image obtaining device 12. When the picture source 16 is a memory, the picture source 16 may be, for example, a local memory or a memory integrated into the image obtaining device 12. When the picture source 16 includes an interface, the interface may be, for example, an external interface for receiving a picture from an external video source. The external video source is, for example, an external picture capturing device such as a camera, an external memory, or an external picture generation device. The external picture generation device is, for example, an external computer graphics processing unit, a computer, or a server. The interface may be any type of interface according to any proprietary or standard interface protocol, such as a high definition multimedia interface (HDMI), a mobile industry processor interface (MIPI), a MIPI standard display serial interface (DSI), a Video Electronics Standards Association (VESA) standard embedded display port (eDP), or a V-by-One interface. The V-by-One interface is a digital interface standard developed for image transmission, and various wired or wireless interfaces, optical interfaces, or the like.

A picture may be considered as a two-dimensional array or matrix of picture element (picture element). The pixel in the array may also be referred to as a sample. A quantity of samples in horizontal and vertical directions (or axes) of the array or the picture defines a size and/or resolution of the picture. For representation of a color, three color components are usually used. The picture may be represented as or include three sample arrays. For example, in an RGB format or color space, the picture includes corresponding red, green, and blue sample arrays. However, in video coding, each pixel is usually represented in a luma/chroma format or color space. For example, a picture in a YUV format includes a luma component indicated by Y (or sometimes indicated by L) and two chroma components indicated by U and V. The luminance (luma) component Y represents luminance or gray level intensity (for example, both are the same in a gray-scale picture), and the two chrominance (chroma) components U and V represent chroma or color information components. Correspondingly, the picture in the YUV format includes a luma sample array of luma sample values (Y) and two chroma sample arrays of chroma values (U and V). A picture in an RGB format may be transformed or converted into a YUV format and vice versa. This process is also referred to as color conversion or color format conversion. If a picture is monochrome, the picture may include only a luma sample array. In this embodiment, a picture transmitted by the picture source 16 to the image processor may also be referred to as raw picture data 17.

The image processor 20 is configured to perform image processing, such as shaping, color format conversion (for example, conversion from an RGB format to a YUV format), toning, or denoising.

The communication interface 22 may be configured to receive processed image data and transmit the picture data 19 that undergoes image processing to the image processing device 14 or any other device (for example, a memory) through the link 13 for storage or direct reconstruction. The other device may be any device used for storage. The communication interface 22 may be, for example, configured to encapsulate the picture data 19 that undergoes image processing into an appropriate format, for example, into a data packet, for transmission over the link 13.

The image processing device 14 includes a communication interface 28, an image processor 32, and a display device 34. Descriptions are separately provided as follows.

The communication interface 28 may be configured to receive the picture data 19 that undergoes image processing from the image obtaining device 12 or any other source. The other source is, for example, a storage device, and the storage device is a device for storing the picture data that undergoes image processing. For examples of the communication interface 22 and the communication interface 28, refer to the foregoing descriptions of the interfaces. Details are not described herein again. The communication interface 28 may be configured to transmit or receive the picture data 19 that undergoes image processing through the link 13 between the image obtaining device 12 and the image processing device 14 or through any type of network. The link 13 is, for example, a direct wired or wireless connection. The any type of network is, for example, a wired or wireless network or any combination thereof, or any type of private or public network or any combination thereof. The communication interface 28 may be, for example, configured to decapsulate the data packet transmitted through the communication interface 22, to obtain the picture data 19 that undergoes image processing.

Both the communication interface 28 and the communication interface 22 may be configured as unidirectional communication interfaces or bidirectional communication interfaces, and may be configured to, for example, send and receive messages to establish a connection, and acknowledge and exchange any other information related to a communication link and/or data transmission such as transmission of picture data that undergoes image processing.

The image processor 32 is configured to perform tone mapping processing on the picture data 19 that undergoes image processing, to obtain picture data 33 that undergoes tone mapping processing. The processing performed by the image processor 32 may further include color format conversion (for example, conversion from a YUV format to an RGB format), toning, shaping, re-sampling, or any other processing. The image processor 32 may be further configured to transmit the picture data 33 that undergoes tone mapping processing to the display device 34.

The display device 34 is configured to receive the picture data 33 that undergoes tone mapping processing, to display a picture, for example, to a user or a viewer. The display device 34 may be or may include any type of display for presenting a reconstructed picture, for example, an integrated or external display or monitor. For example, the display may include a liquid crystal display (LCD), an organic light emitting diode (OLED) display, a plasma display, a projector, a micro LED display, a liquid crystal on silicon (LCOS) display, a digital light processor (DLP), or any other display.

Although FIG. 1 depicts the image obtaining device 12 and the image processing device 14 as separate devices, the device embodiment may also include both the image obtaining device 12 and the image processing device 14 or include functionalities of both the image obtaining device 12 and the image processing device 14, that is, the image obtaining device 12 or a corresponding functionality and the image processing device 14 or a corresponding functionality. In such an embodiment, the image obtaining device 12 or the corresponding functionality and the image processing device 14 or the corresponding functionality may be implemented by using same hardware and/or software, separate hardware and/or software, or any combination thereof.

Although FIG. 1 depicts the image processing device 14 and the display device 34 as separate devices, the device embodiment may also include both the image processing device 14 and the display device 34 or include functionalities of both the image processing device 14 and the display device 34, that is, the image processing device 14 or a corresponding functionality and the display device 34 or a corresponding functionality. In such an embodiment, the image processing device 14 or the corresponding functionality and the display device 34 or the corresponding functionality may be implemented by using same hardware and/or software, separate hardware and/or software, or any combination thereof.

Based on the descriptions, a person skilled in the art easily understands that existence and (accurate) division of functionalities of different units or functionalities/a functionality of the image obtaining device 12 and/or the image processing device 14 shown in FIG. 1 may vary with an actual device and application. The image obtaining device 12 and the image processing device 14 may include any one of a wide range of devices, including any type of handheld or stationary device, for example, a notebook or laptop computer, a mobile phone, a smartphone, a tablet or tablet computer, a video camera, a desktop computer, a set-top box, a television, a camera, a vehicle-mounted device, a display device, a digital media player, a video game console, a video streaming device (for example, a content service server or a content delivery server), a broadcast receiver device, or a broadcast transmitter device, and may use or not use any type of operating system.

The image processor 20 and the image processor 32 each may be implemented as any one of various appropriate circuits, for example, one or more microprocessors, digital signal processors (DSP), application-specific integrated circuits (ASIC), field programmable gate arrays (field-programmable gate array, FPGA), discrete logic, hardware, or any combination thereof. If the technologies are implemented partially by using software, a device may store software instructions in an appropriate and non-transitory computer-readable storage medium and may execute instructions by using hardware such as one or more processors, to perform the technologies of this disclosure. Any one of the foregoing content (including hardware, software, a combination of hardware and software, and the like) may be considered as one or more processors.

The image obtaining device 12 may capture, by receiving an optical signal from a natural scene, a picture or a video including the natural scene. To facilitate image or video transmission, the optical signal needs to be converted into an electrical signal, and image information of each pixel needs to be recorded by using a luminance value or chrominance value (for example, a grayscale value between 0 and 255) whose value range is fixed. A curve for converting the optical signal into the electrical signal is an optical-to-electrical conversion function. Common optical-to-electrical conversion functions include a PQ (perceptual quantizer) optical-to-electrical conversion function, an HLG (hybrid log-gamma) optical-to-electrical conversion function, and a scene luminance fidelity (SLF) optical-to-electrical conversion function. The display device may reproduce the natural scene by displaying the picture or video. Generally, the image obtaining device 12 and the display device are located at two different positions. Therefore, the image obtaining device 12 is often referred to as a front-end device, and the display device is referred to as a back-end device. The display device may determine, based on the optical-to-electrical conversion function and the luminance value or the grayscale value of each pixel in the image, luminance of an object during photographing, that is, the electronic device may convert YUV or RGB information into luminance whose unit is nit. The luminance of the object may exceed a display capability of the display device. Because luminance information obtained by the image obtaining device 12 does not match a luminance display capability of the display device, there are a case in which a display device with a low luminance display capability is used to display a high luminance image and a case in which a display device with a high luminance display capability is used to display a low luminance image. The first case is also referred to as a high-to-low tone mapping process, and the second case is also referred to as a low-to-high tone mapping process. Tone mapping is a computer graphics technology for approximately displaying a high dynamic range image on a display device with a limited dynamic range display capability. In one manner, a tone of the high dynamic range image may be mapped, based on a tone mapping curve, to a display device with a low dynamic range display capability. It should be noted that the tone mapping curve may be determined by the display device or may be determined by a processing device located outside the display device.

However, in some cases, when the determined tone mapping curve is inaccurate, a display of the high dynamic range image is poor. For example, in a video playback process, if only one tone mapping curve is determined for the video, image content displayed between different video frames may differ greatly. For example, images displayed in some video frames are very dark, but images displayed in other video frames are very bright. If a fixed tone mapping curve is used for the entire video, a picture of each frame in the video cannot be reproduced perfectly on the display device. In addition, the tone mapping curve carries a large amount of data. If one tone mapping curve is determined for each image or picture frame, data redundancy may be introduced.

An image processing method and apparatus may avoid the foregoing problem.

Figure 2:
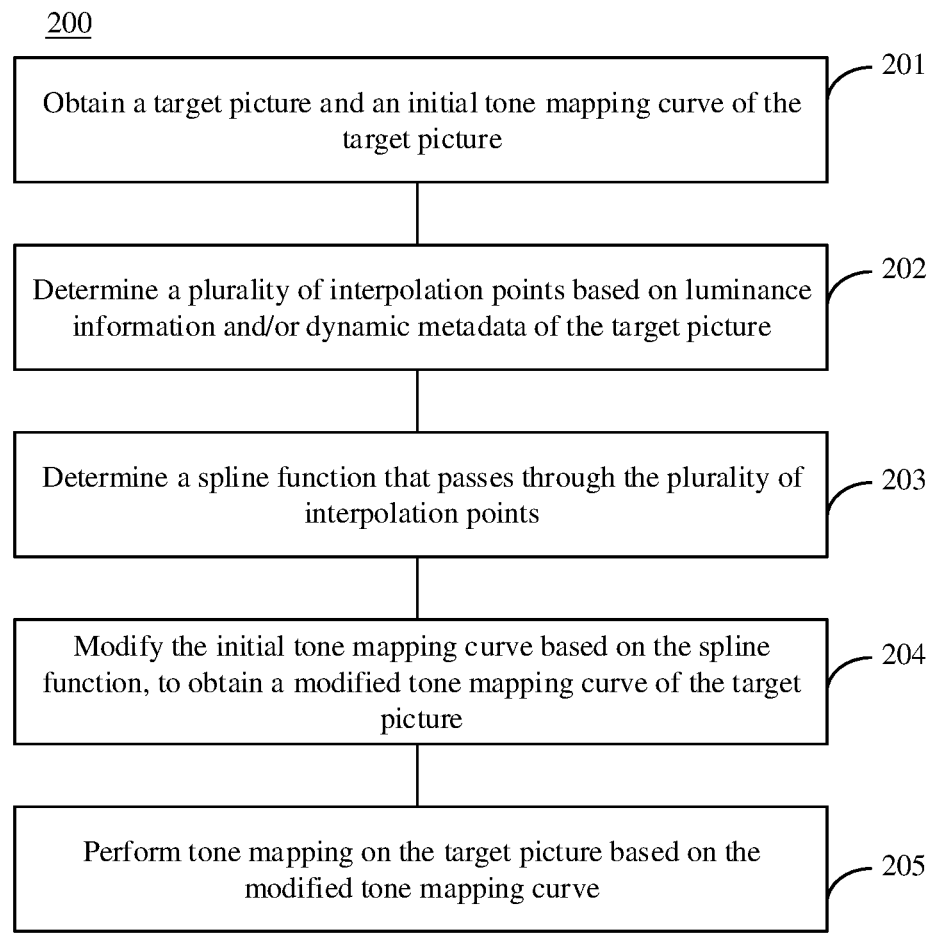
FIG. 2 is a schematic flowchart of an image processing method according to an embodiment.

FIG. 2 is a schematic flowchart of an image processing method. The method shown in FIG. 2 may be performed by a processor used for tone mapping. For example, the processor may be the image processing device 14 shown in FIG. 1, an image obtaining device 12 including a tone mapping processor, or a display device including a tone mapping processor.

201: Obtain a target picture and an initial tone mapping curve of the target picture.

The target picture may be obtained by using the picture source 16 shown in FIG. 1. The target picture may be a frame of picture in a video, or may be a still picture, or may be a region in a picture, for example, several image blocks in a picture.

Figure 3:
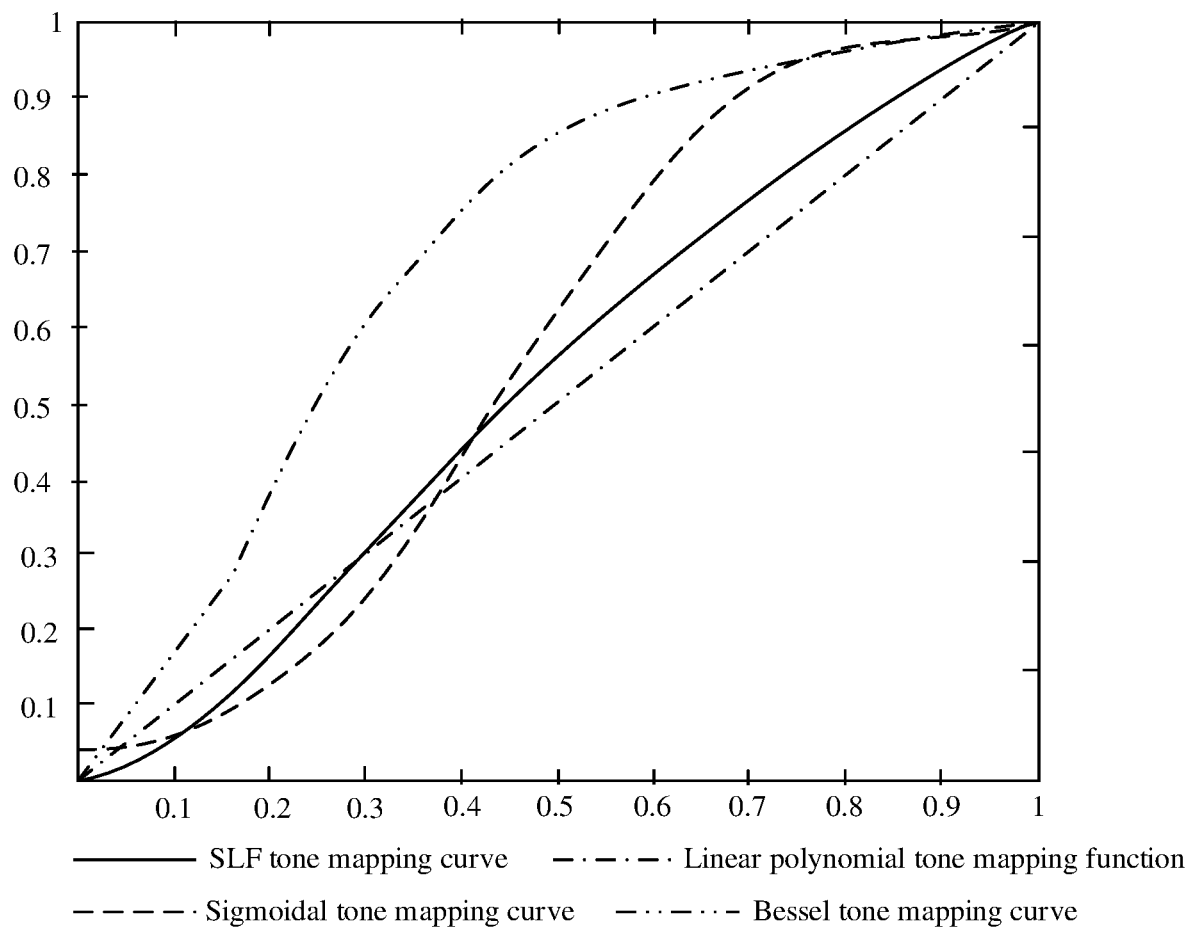
FIG. 3 is a schematic diagram of a plurality of initial tone mapping curves according to an embodiment.

The initial tone mapping curve may be a curve of any form that can be used for a tone mapping process. FIG. 3 shows several possible forms of initial tone mapping curves.

An initial tone mapping curve shown by a solid line in FIG. 3 is also referred to as an SLF tone mapping curve and satisfies:

$$L' = a \times \left(\frac{p \times L}{(p-1) \times L + 1}\right)^m + b,$$

where L represents a linear signal value, L' represents a nonlinear signal value, p, a, m, and b are all dynamic range mapping coefficients, $0 \leq L \leq 1$, and $0 \leq L' \leq 1$; a is directly proportional to a dynamic range display capability of a display device, and is inversely proportional to a dynamic range of a target picture; and b is directly proportional to a minimum luminance display capability of the display device.

An initial tone mapping curve shown by a single-dot dashed line in FIG. 3 is a linear polynomial tone mapping function and satisfies:

$$L' = a \times L + b,$$

where L represents a linear signal value, L' represents a nonlinear signal value, a and b are both dynamic range mapping coefficients, $0 \leq L \leq 1$, and $0 \leq L' \leq 1$; a is directly proportional to a dynamic range display capability of a display device, and is inversely proportional to a dynamic range of a target picture; and b is directly proportional to a minimum luminance display capability of the display device.

An initial tone mapping curve shown by a dashed line in FIG. 3 is also referred to as a sigmoidal tone mapping curve and satisfies:

$$L' = \frac{c_1 + c_2 \times L^n}{1 + c_3 \times L^n},$$

where L represents a linear signal value, L' represents a nonlinear signal value, $c_1$, $c_2$, $c_3$, and n are all dynamic range mapping coefficients, $0 \leq L \leq 1$, and $0 \leq L' \leq 1$; and $c_1$, $c_2$, $c_3$, and n are all related to average luminance, maximum luminance, and minimum luminance of a target picture, and are related to minimum display luminance and maximum display luminance of a display device.

An initial tone mapping curve shown by a double-dot dashed line in FIG. 3 is also referred to as a Bessel tone mapping curve and satisfies:

$$L' \sum_{\rho=0}^{N} \binom{N}{\rho} \times L^\rho \times (1-L)^{N-\rho} \times P_\rho,$$

where L represents a linear signal value, L' represents a nonlinear signal value, n, N, and ρ are all dynamic range mapping coefficients, $0 \leq L \leq 1$, and $0 \leq L' \leq 1$; and n, N, and p are related to luminance distribution of a target image and also related to average luminance of the target image.

An electronic device may determine a parameter on the initial tone mapping curve based on luminance information and/or dynamic metadata of the target picture.

It should be understood that both a luminance value in a YUV format and a grayscale value in an RGB format may reflect luminance of the image. Therefore, the luminance information may be, for example, the luminance value in the YUV format or the grayscale value in the RGB format.

It should be understood that the dynamic metadata may include information about a luminance range and information about a proportion of each luminance range. For example, a quantity of pixels within a luminance range of 0-10 nits is 200. The dynamic metadata further includes average luminance of pixels within the luminance range. For example, average luminance of pixels within the luminance range of 0-10 nits is 6.2 nits.

Using an SLF formula as an example, p and m may be determined by overall luminance of the image. When overall luminance of the image is high, a value of p is relatively small, and a value of m is relatively large. When overall luminance of the image is low, the value of p is relatively large and the value of m is relatively small. A value range of p may be 3-6. A value range of m may be 2-4, and m is usually 2.4. The electronic device may statistically analyze the luminance information and determine the overall luminance of the image. The electronic device may determine, based on information included in the dynamic metadata, that the overall luminance of the image is high when a proportion of bright pixels is relatively high, and determine that the overall luminance of the image is low when a proportion of dark pixels is relatively high.

Optionally, the initial tone mapping curve may be a curve that undergoes normalization processing, that is, coordinates of any point on the initial tone mapping curve are (first coordinate value 1, second coordinate value 1). A value range of the first coordinate value 1 is 0-1. A value range of the second coordinate value 1 is 0-1. The following describes the initial tone mapping curve that undergoes normalization processing. It should be understood that this is not limited.

202: Determine a plurality of interpolation points based on luminance information and/or dynamic metadata of the target picture.

An objective of determining the plurality of interpolation points is to determine a spline function for modifying the initial tone mapping curve. By determining the plurality of interpolation points, the spline function can be defined to pass through the plurality of interpolation points, to obtain an image display with a better tone mapping.

Determining an interpolation point may be determining coordinates of the interpolation point, or the first coordinate value or the second coordinate value of the interpolation point. The coordinates of the interpolation point may be expressed as (x, y), where x may represent the first coordinate value, and y may represent the second coordinate value. The electronic device may determine the plurality of interpolation points based on the luminance information of the image, or based on the dynamic metadata of the image, or based on the luminance information of the image and the dynamic metadata of the image. For example, the electronic device determines the first coordinate value of an interpolation point 1, the second coordinate value of an interpolation point 2, and coordinates of an interpolation point 3.

An objective of determining the interpolation point may be to determine a modification position of the initial tone mapping curve. In other words, there may be a modification range between two interpolation points included in the plurality of interpolation points, and the electronic device may modify the initial tone mapping curve within the modification range.

In an example, the electronic device determines that the first coordinate value of the interpolation point 1 is the first coordinate value 1, that the first coordinate value of the interpolation point 2 is the first coordinate value 2, and that the first coordinate value 1 is less than the first coordinate value 2, and the electronic device may determine to modify the initial tone mapping curve in an interval from the first coordinate value 1 to the first coordinate value 2.

Similarly, the electronic device determines that the second coordinate value of the interpolation point 1 is the second coordinate value 1, that the second coordinate value of the interpolation point 2 is the second coordinate value 2, and that the second coordinate value 1 is less than the second coordinate value 2, and the electronic device may determine to modify the initial tone mapping curve in an interval from the second coordinate value 1 to the second coordinate value 2.

In an example, the electronic device determines that the first coordinate value of the interpolation point 1 is the first coordinate value 1, and that the second coordinate value of the interpolation point 2 is the second coordinate value 2. The electronic device may determine, based on the initial tone mapping curve, that the first coordinate value corresponding to the second coordinate value 2 is the first coordinate value 2. The electronic device determines that the first coordinate value 1 is less than the first coordinate value 2 and may determine to modify the initial tone mapping curve in the interval from the second coordinate value 1 to the second coordinate value 2.

Similarly, the electronic device determines that the second coordinate value of the interpolation point 1 is the first coordinate value 1, and that the second coordinate value of the interpolation point 2 is the second coordinate value 2. The electronic device may determine, based on the initial tone mapping curve, that the second coordinate value corresponding to the first coordinate value 1 is the second coordinate value 1. The electronic device determines that the second coordinate value 1 is less than the second coordinate value 2 and may determine to modify the initial tone mapping curve in the interval from the second coordinate value 1 to the second coordinate value 2.

In an example, the electronic device determines that coordinates of the interpolation point 1 are (first coordinate value 1, second coordinate value 1), that coordinates of the interpolation point 2 are (first coordinate value 2, second coordinate value 2), and that the first coordinate value 1 is less than the first coordinate value 2 (the second coordinate value 1 is less than the second coordinate value 2 because the initial tone mapping curve is usually a monotonic increasing function), and may determine to modify the initial tone mapping curve in the interval from the first coordinate value 1 to the first coordinate value 2 (or the interval from the second coordinate value 1 to the second coordinate value 2).

Figure 4:
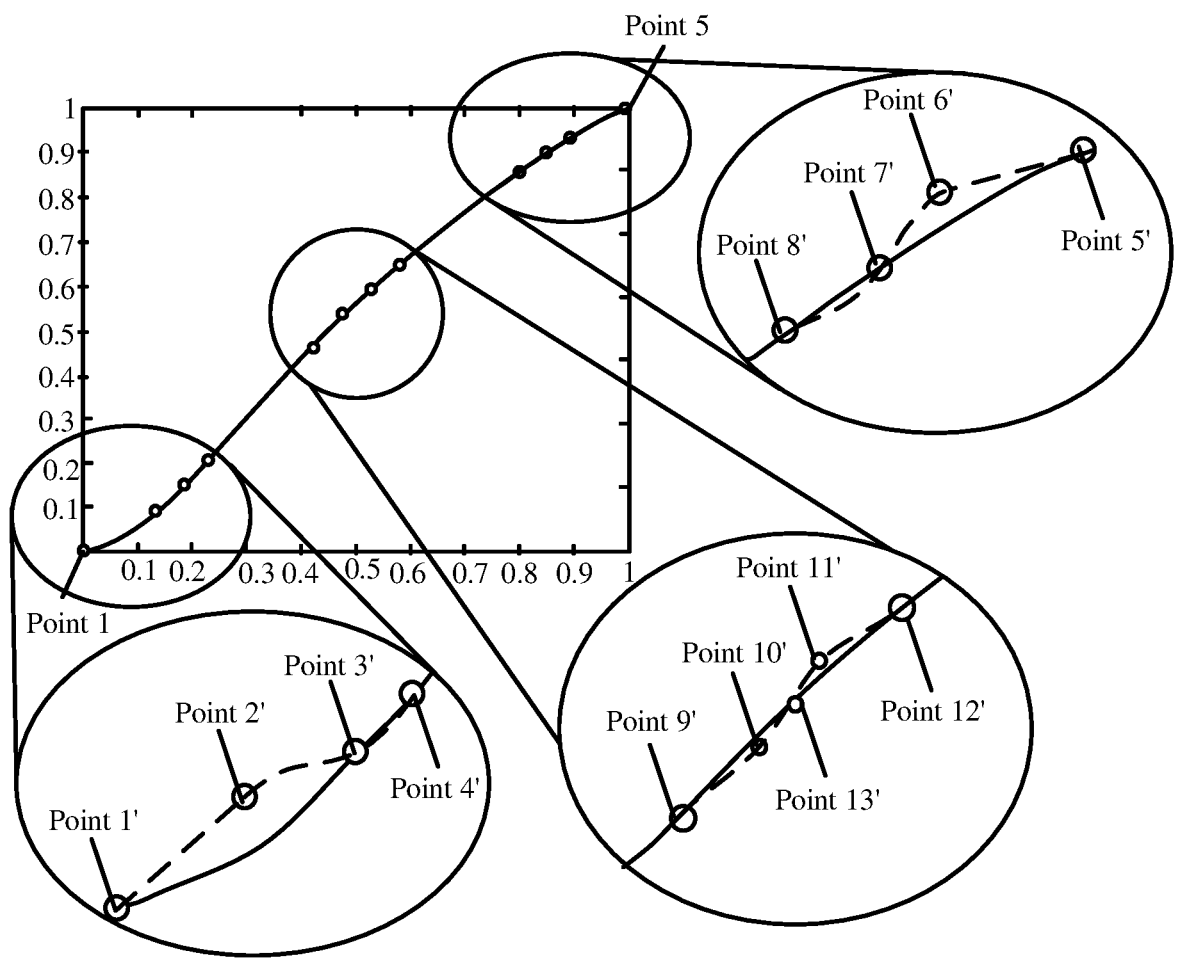
FIG. 4 is a schematic diagram of a plurality of spline functions according to an embodiment.

The initial tone mapping curve includes two endpoints, which are a first endpoint and a second endpoint respectively, for example, a point 1 and a point 5 shown in FIG. 4. A luminance value corresponding to the first endpoint is relatively low and the first endpoint is located in a dark region of the image. A luminance value corresponding to the second endpoint is relatively high and the second endpoint is located in a bright region of the image. When the image is dark, the electronic device may determine that an interpolation point exists at the first endpoint or a position close to the first endpoint. When the image is bright, the electronic device may determine that an interpolation point exists at the second endpoint or a position close to the second endpoint. When the image includes a part of pixels with relatively small luminance differences, a location of an interpolation point may be determined based on luminance of the part of pixels and the overall luminance of the image. For example, when the luminance range of the picture is between 100 nits and 300 nits, and 50% of pixels are within the range of 195 nits and 205 nits, it may be determined that an interpolation point exists near a middle segment of the initial tone mapping curve.

Figure 5:
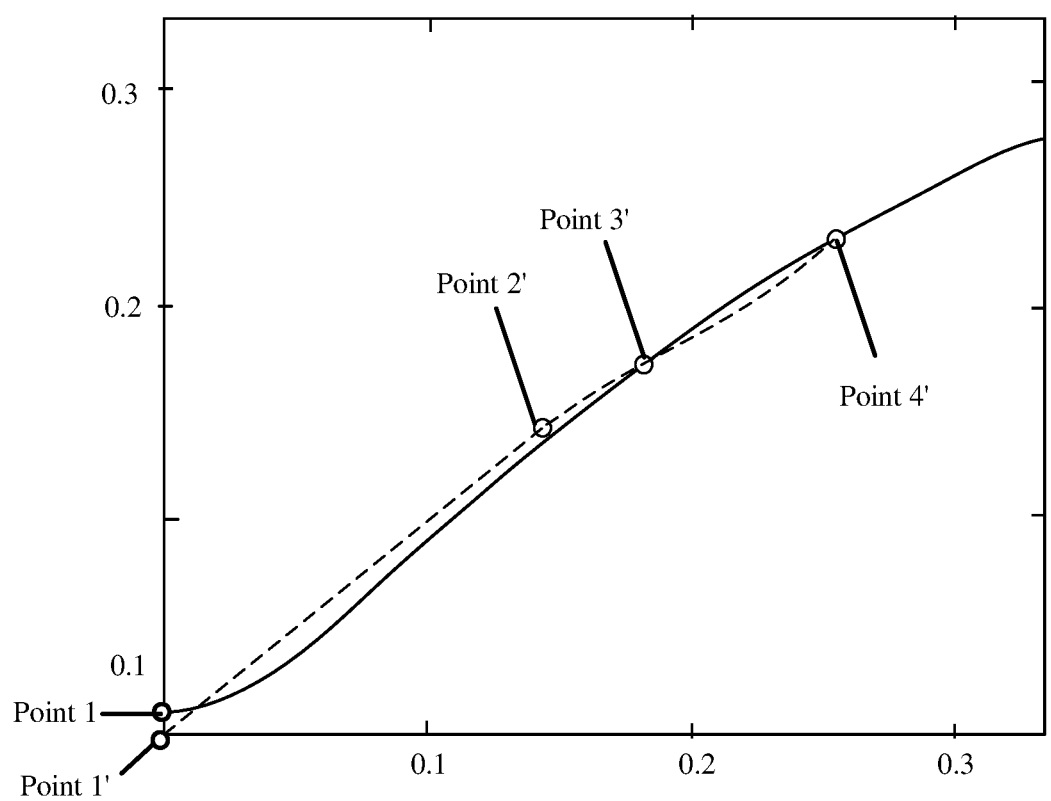
FIG. 5 is a schematic diagram of a spline function for modifying an initial tone mapping curve for a dark region according to an embodiment.

Scenario 1: When the image is dark, the electronic device may determine that an interpolation point exists at the first endpoint or a position close to the first endpoint. FIG. 5 shows interpolation points and spline functions in this scenario.

Optionally, the initial tone mapping curve includes the first endpoint and the second endpoint, the first endpoint and the second endpoint are respectively located at two ends of the initial tone mapping curve, the luminance value corresponding to the first endpoint is less than the luminance value corresponding to the second endpoint, a quantity of dark region pixels included in the target picture is greater than or equal to a second preset threshold, luminance values of the dark region pixels are less than a first preset threshold, the plurality of interpolation points include a first interpolation point, and the determining a plurality of interpolation points based on luminance information of the target picture includes: determining that the first coordinate value of the first interpolation point is the same as the first coordinate value of the first endpoint.

The luminance value corresponding to the first endpoint may correspond to the first coordinate value of the first endpoint, and/or correspond to the second coordinate value of the first endpoint. The luminance value corresponding to the second endpoint may correspond to the first coordinate value of the second endpoint, and/or correspond to the second coordinate value of the second endpoint.

For example, if the first preset threshold is 20, it may be considered that a pixel whose value of a Y component in the YUV format is less than 20 is a dark region pixel, or that a pixel whose value of an R/G/B component in the RGB format is less than 20 is a dark region pixel. For another example, if the first preset threshold is 20 nits, it may be considered that a pixel whose luminance is less than 20 nits is a dark region pixel.

Therefore, when the target picture includes a sufficient quantity of dark region pixels, the first endpoint may be selected as the first interpolation point, and it is determined that the first coordinate value of the first endpoint is the same as the first coordinate value of the first interpolation point. In other words, when the target picture includes a sufficient quantity of dark region pixels, a segment close to the first endpoint on the initial tone mapping curve may be modified.

Optionally, the initial tone mapping curve includes the first endpoint and the second endpoint, the first endpoint and the second endpoint are respectively located at two ends of the initial tone mapping curve, the dynamic metadata includes P pieces of coordinate information in a one-to-one correspondence with P key pixels, P is a positive integer, and the determining a plurality of interpolation points based on luminance information and dynamic metadata of the target picture includes: determining, based on the P pieces of coordinate information and the luminance information of the target picture, that the P key pixels are dark region pixels, where luminance values of the dark region pixels are less than a first preset threshold; and when the P key pixels are the dark region pixels, determining that the plurality of interpolation points include a first interpolation point, where the first coordinate value of the first interpolation point is the same as the first coordinate value of the first endpoint.

For example, if the first preset threshold is 20, it may be considered that a pixel whose value of a Y component in the YUV format or average value is less than 20 is a dark region pixel, or that a pixel whose value of an R/G/B component in the RGB format or average value is less than 20 is a dark region pixel. For another example, if the first preset threshold is 20 nits, it may be considered that a pixel whose luminance or average luminance is less than 20 nits is a dark region pixel.

Therefore, the dynamic metadata indicates several key pixels, and whether the several key pixels are dark region pixels may be determined based on average luminance or maximum luminance of the key pixels. When the several key pixels are the dark region pixels, the first endpoint of the luminance mapping curve is used as the first interpolation point, and it is determined that the first coordinate value of the first endpoint is the same as the first coordinate value of the first interpolation point. In other words, when the several key pixels are the dark region pixels, a segment close to the first endpoint on the initial tone mapping curve may be modified.

A dark region pixel may be understood as a pixel with low luminance. The dark region pixel may be a key pixel indicated in the dynamic metadata. The dark region pixel may alternatively be determined by the electronic device autonomously based on luminance distribution of the pixels. In other words, whether the target picture includes a dark region pixel may be determined in different manners.

Optionally, the initial tone mapping curve includes the first endpoint and the second endpoint, the first endpoint and the second endpoint are respectively located at two ends of the initial tone mapping curve, and the dynamic metadata includes region luminance indication information; and when the region luminance indication information indicates a dark region, the plurality of interpolation points include a first interpolation point, and the first coordinate value of the first interpolation point is the same as the first coordinate value of the first endpoint.

When the dynamic metadata includes indication information indicating the dark region, the first coordinate value of the first interpolation point is the same as the first coordinate value of the first endpoint. The first interpolation point is, for example, a point 1' shown in FIG. 4. For example, when the indication information is 0 or includes an indication of "dark", it is determined that the first coordinate value of the first interpolation point is the same as the first coordinate value of the first endpoint.

The initial tone mapping curve is shown in FIG. 4. The two ends of the initial tone mapping curve are the point 1 and the point 5 respectively. The first endpoint may be the point 1 shown in FIG. 4, and the second endpoint may be the point 5 shown in FIG. 4. It can be learned from the figure that the luminance value corresponding to the first endpoint is low, and that the luminance value corresponding to the second endpoint is high. As shown in FIG. 4, the first interpolation point may be the point 1', the first endpoint may be the point 1, and the first coordinate value of the point 1 is the same as the first coordinate value of the point 1'. In some cases, the point 1 coincides with the point 1', that is, the first coordinate value of the point 1 is the same as the first coordinate value of the point 1', and the second coordinate value of the point 1 is the same as the second coordinate value of the point 1'. The second coordinate value of the first interpolation point may be obtained based on an empirical value, a user input value, or the initial tone mapping curve.

Next, the modification range of the initial tone mapping curve needs to be determined. A second interpolation point may be determined, so that the initial tone mapping curve between the first interpolation point and the second interpolation point is modified, to ensure that a high dynamic range picture can be displayed on a display device with a low dynamic range display capability or ensure that image details of a dark scene are better presented on a display device. As shown in FIG. 4, a fifth interpolation point may be a point 2'.

Optionally, the plurality of interpolation points further include the second interpolation point, and the determining a plurality of interpolation points based on luminance information of the target picture includes: determining the first coordinate value of the second interpolation point based on the quantity of the dark region pixels.

When the quantity of the dark region pixels is relatively large, or a proportion of the dark region pixels to all the pixels is relatively high, the first coordinate value of the second interpolation point is close to the first coordinate value of the first interpolation point. When the quantity of the dark region pixels is relatively small, or the proportion of the dark region pixels to all the pixels is relatively low, the first coordinate value of the second interpolation point is far away from the first coordinate value of the first interpolation point. In other words, when the quantity of the dark region pixels is relatively large, the modification range of the initial tone mapping curve close to the first endpoint is relatively small, but when the quantity of the dark region pixels is relatively small and is greater than the second preset threshold, the modification range of the initial tone mapping curve close to the first endpoint is relatively large. The second coordinate value of the second interpolation point may be obtained based on an empirical value, a user input value, or the initial tone mapping curve.

In addition, a modified tone mapping curve may be smooth and derivable. Therefore, a third interpolation point may be determined, so that the spline function for modifying the initial tone mapping curve can be smoothly connected to the initial tone mapping curve at the third interpolation point.

The modification range for modifying the initial tone mapping curve may include a strong modification range and a weak modification range. A modification range between the first interpolation point and the second interpolation point may be understood as a strong modification range, and a modification range between the second interpolation point and the third interpolation point may be understood as a weak modification range. The weak modification range is a transitional modification range between the strong modification range and a non-modification range. Similarly, the spline function for modifying the initial tone mapping curve may include a strong modification spline function and a weak modification spline function. A spline function between the first interpolation point and the second interpolation point may be understood as a strong modification spline function, and a spline function between the second interpolation point and the third interpolation point may be understood as a weak modification spline function. The weak modification spline function is a transitional modification spline function between the strong modification spline function and the initial tone mapping curve. In addition, because the spline function between the second interpolation point and the third interpolation point is different from the initial tone mapping curve, the spline function between the second interpolation point and the third interpolation point has a curve modification function in addition to a transitional curve function. As shown in FIG. 4, the third interpolation point may be a point 4'.

Optionally, the plurality of interpolation points further include the third interpolation point, the target picture further includes dark region transition pixels, luminance values of the dark region transition pixels are greater than or equal to the first preset threshold, and the determining a plurality of interpolation points based on luminance information of the target picture includes: determining the first coordinate value of the third interpolation point based on the quantity of the dark region transition pixels.

The dark region transition pixel is a pixel whose luminance is greater than the first preset threshold mentioned above. For example, if the first preset threshold is 20, it may be considered that a pixel whose value of a Y component in the YUV format is greater than 20 is a dark region transition pixel, or that a pixel whose value of an R/G/B component in the RGB format is greater than 20 is a dark region transition pixel. For another example, if the third preset threshold is 100 nits, it may be considered that a pixel whose luminance is greater than 100 nits is a dark region transition pixel. In some cases, luminance of the dark region transition pixel is less than a fifth preset threshold, and the fifth preset threshold is greater than the first preset threshold.

Optionally, the plurality of interpolation points further include the third interpolation point, the dynamic metadata includes Q pieces of coordinate information in a one-to-one correspondence with Q key pixels, Q is a positive integer, and when the plurality of interpolation points include the first interpolation point, the determining a plurality of interpolation points based on luminance information and dynamic metadata of the target picture includes: determining, based on the Q pieces of coordinate information and the luminance information of the target picture, that the Q key pixels are dark region transition pixels, where luminance values of the dark region pixels are greater than or equal to the first preset threshold; and when the Q key pixels are the dark region pixels, determining that the plurality of interpolation points include the third interpolation point, where the first coordinate value of the third interpolation point is the same as the first coordinate value of the first endpoint.

The dark region transition pixel is a pixel whose luminance or average luminance is greater than the first preset threshold mentioned above. For example, if the first preset threshold is 20, it may be considered that a pixel whose value of a Y component in the YUV format or average value is greater than 20 is a dark region transition pixel, or that a pixel whose value of an R/G/B component in the RGB format or average value is greater than 20 is a dark region transition pixel. For another example, if the third preset threshold is 100 nits, it may be considered that a pixel whose luminance or average luminance is greater than 100 nits is a dark region transition pixel. In some cases, luminance of the dark region transition pixel is less than a fifth preset threshold, and the fifth preset threshold is greater than the first preset threshold.

When a quantity of dark region transition pixels is relatively large, or a proportion of dark region transition pixels to all the pixels is relatively high, the first coordinate value of the third interpolation point is close to the first coordinate value of the second interpolation point. When the quantity of the dark region transition pixels is relatively small, or the proportion of the dark region transition pixels to all the pixels is relatively low, the first coordinate value of the third interpolation point is far away from the first coordinate value of the second interpolation point. In other words, when the quantity of the dark region transition pixels is relatively large, the weak modification spline function is relatively short, but when the quantity of the dark region transition pixels is relatively small, the weak modification spline function is relatively long.

The dark region transition pixel may be understood as a pixel whose luminance is low and whose luminance is higher than that of a dark region pixel. The dark region transition pixel may be a key pixel indicated in the dynamic metadata. The dark region transition pixel may alternatively be determined by the electronic device autonomously based on luminance distribution of the pixels. In other words, the quantity of the dark region transition pixels in the target picture may be determined in different manners. The second coordinate value of the third interpolation point may be obtained based on an empirical value, a user input value, or the initial tone mapping curve.

Figure 6:
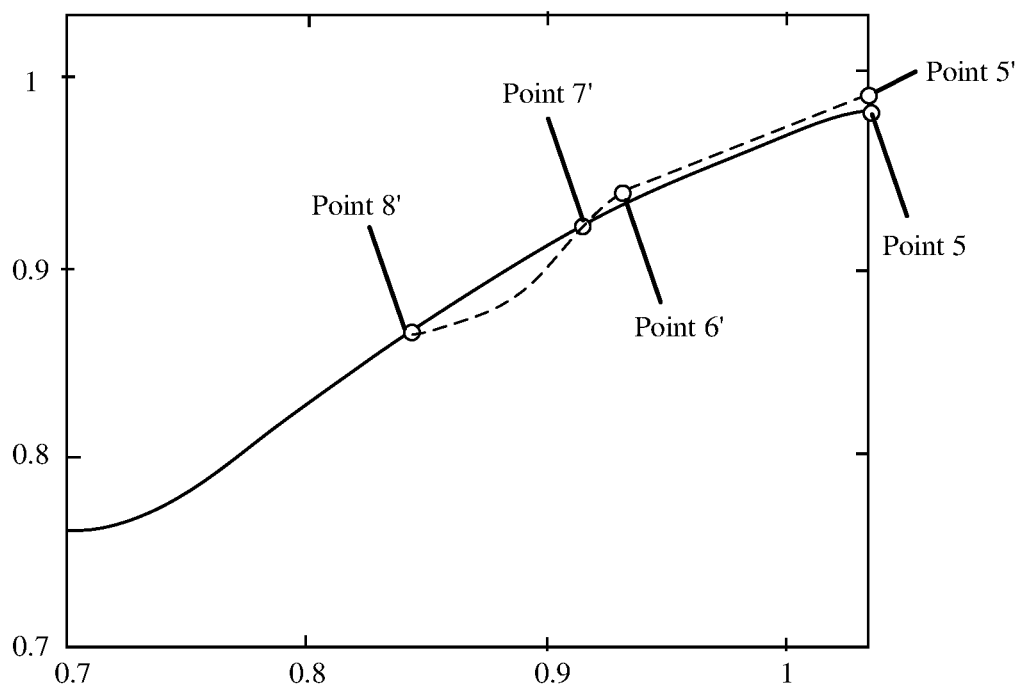
FIG. 6 is a schematic diagram of a spline function for modifying an initial tone mapping curve for a bright region according to an embodiment.

Scenario 2: When the image is bright, the electronic device may determine that an interpolation point exists at the second endpoint or a position close to the second endpoint. FIG. 6 shows interpolation points and spline functions in this scenario.

Optionally, the initial tone mapping curve includes the first endpoint and the second endpoint, the first endpoint and the second endpoint are respectively located at two ends of the initial tone mapping curve, the luminance value corresponding to the first endpoint is less than the luminance value corresponding to the second endpoint, a quantity of bright region pixels included in the target picture is greater than or equal to a fourth preset threshold, luminance values of the bright region pixels are greater than a third preset threshold, the plurality of interpolation points include a fourth interpolation point, and the determining a plurality of interpolation points based on luminance information of the target picture includes: determining that the first coordinate value of the fourth interpolation point is the same as the first coordinate value of the second endpoint.

The luminance value corresponding to the first endpoint may correspond to the first coordinate value of the first endpoint, and/or correspond to the second coordinate value of the first endpoint. The luminance value corresponding to the second endpoint may correspond to the first coordinate value of the second endpoint, and/or correspond to the second coordinate value of the second endpoint.

For example, if the third preset threshold is 200, it may be considered that a pixel whose value of a Y component in the YUV format is greater than 200 is a bright region pixel, or that a pixel whose value of an R/G/B component in the RGB format is greater than 200 is a bright region pixel. For another example, if the third preset threshold is 400 nits, it may be considered that a pixel whose luminance is greater than 400 nits is a bright region pixel.

Therefore, when the target picture includes a sufficient quantity of bright region pixels, the second endpoint may be determined as an interpolation point (corresponding to the fourth interpolation point in this embodiment) for modifying a bright region. For example, it is determined that the first coordinate value of the second endpoint is the same as the first coordinate value of the fourth interpolation point. In other words, when the target picture includes a sufficient quantity of bright region pixels, a segment close to the second endpoint on the initial tone mapping curve may be modified.

Optionally, the initial tone mapping curve includes the first endpoint and the second endpoint, the first endpoint and the second endpoint are respectively located at two ends of the initial tone mapping curve, the dynamic metadata includes P pieces of coordinate information in a one-to-one correspondence with P key pixels, P is a positive integer, and the determining a plurality of interpolation points based on luminance information and dynamic metadata of the target picture includes: determining, based on the P pieces of coordinate information and the luminance information of the target picture, that the P key pixels are bright region pixels, where luminance values of the bright region pixels are greater than a third preset threshold; and when the P key pixels are the bright region pixels, determining that the plurality of interpolation points include a fourth interpolation point, where the first coordinate value of the fourth interpolation point is the same as the first coordinate value of the second endpoint.

For example, if the third preset threshold is 200, it may be considered that a pixel whose value of a Y component in the YUV format or average value is greater than 200 is a bright region pixel, or that a pixel whose value of an R/G/B component in the RGB format or average value is greater than 200 is a bright region pixel. For another example, if the third preset threshold is 400 nits, it may be considered that a pixel whose luminance or average luminance is greater than 400 nits is a bright region pixel.

Therefore, the dynamic metadata indicates several key pixels, and whether the several key pixels are bright region pixels may be determined based on average luminance or maximum luminance of the key pixels. When the several key pixels are the bright region pixels, it is determined that the first coordinate value of the second endpoint is the same as the first coordinate value of the fourth interpolation point. In other words, when the several key pixels are the bright region pixels, a segment close to the second endpoint on the initial tone mapping curve may be modified.

A bright region pixel may be understood as a pixel with high luminance. The bright region pixel may be a key pixel indicated in the dynamic metadata. The bright region pixel may alternatively be determined by the electronic device autonomously based on luminance distribution of the pixels. In other words, whether the target picture includes a bright region pixel may be determined in different manners.

Optionally, the initial tone mapping curve includes the first endpoint and the second endpoint, the first endpoint and the second endpoint are respectively located at two ends of the initial tone mapping curve, and the dynamic metadata includes region luminance indication information; and when the region luminance indication information indicates a bright region, the plurality of interpolation points include a fourth interpolation point, and the first coordinate value of the fourth interpolation point is the same as the first coordinate value of the second endpoint.

When the dynamic metadata includes indication information indicating the bright region, the first coordinate value of the fourth interpolation point is the same as the first coordinate value of the second endpoint. The fourth interpolation point is, for example, a point 5' shown in FIG. 4. For example, when the indication information is 1 or includes "light" or another indication related to the bright region, it is determined that the first coordinate value of the fourth interpolation point is the same as the first coordinate value of the second endpoint.

The initial tone mapping curve is shown in FIG. 4. The two ends of the initial tone mapping curve are the point 1 and the point 5 respectively. The first endpoint may be the point 1 shown in FIG. 4, and the second endpoint may be the point 5 shown in FIG. 4. It can be learned from the figure that the luminance value corresponding to the first endpoint is low, and that the luminance value corresponding to the second endpoint is high. As shown in FIG. 4, the fourth interpolation point may be the point 5', the first endpoint may be the point 5, and the first coordinate value of the point 5 is the same as the first coordinate value of the point 5'. In some cases, the point 5 coincides with the point 5', that is, the first coordinate value of the point 5 is the same as the first coordinate value of the point 5', and the second coordinate value of the point 5 is the same as the second coordinate value of the point 5'. The second coordinate value of the fourth interpolation point may be obtained based on an empirical value, a user input value, or the initial tone mapping curve.

Next, the modification range of the initial tone mapping curve needs to be determined. A fifth interpolation point may be determined, so that the initial tone mapping curve between the fourth interpolation point and the fifth interpolation point is modified, to ensure that a high dynamic range picture can be displayed on a display device with a low dynamic range display capability or ensure that image details of a bright scene are better presented on a display device. As shown in FIG. 4, the fifth interpolation point may be a point 6'.

Optionally, the plurality of interpolation points further include the fifth interpolation point, and the determining a plurality of interpolation points based on luminance information of the target picture includes: determining the first coordinate value of the fifth interpolation point based on the quantity of the bright region pixels.

When the quantity of the bright region pixels is relatively large, or a proportion of the bright region pixels to all the pixels is relatively high, the first coordinate value of the fifth interpolation point is close to the first coordinate value of the fourth interpolation point. When the quantity of the bright region pixels is relatively small, or the proportion of the bright region pixels to all the pixels is relatively low, the first coordinate value of the fifth interpolation point is far away from the first coordinate value of the fourth interpolation point. In other words, when the quantity of the bright region pixels is relatively large, the modification range of the initial tone mapping curve close to the second endpoint is relatively small, but when the quantity of the bright region pixels is relatively small and is greater than the fourth preset threshold, the modification range of the initial tone mapping curve close to the second endpoint is relatively large. The second coordinate value of the fifth interpolation point may be obtained based on an empirical value, a user input value, or the initial tone mapping curve.

In addition, a modified tone mapping curve needs to be smooth and derivable. Therefore, a sixth interpolation point may be determined, so that the spline function for modifying the initial tone mapping curve can be smoothly connected to the initial tone mapping curve at the sixth interpolation point. As shown in FIG. 4, the sixth interpolation point may be a point 8'.

The modification range for modifying the initial tone mapping curve may include a strong modification range and a weak modification range. A modification range between the fourth interpolation point and the fifth interpolation point may be understood as a strong modification range, and a modification range between the fifth interpolation point and the sixth interpolation point may be understood as a weak modification range. The weak modification range is a transitional modification range between the strong modification range and a non-modification range. Similarly, the spline function for modifying the initial tone mapping curve may include a strong modification spline function and a weak modification spline function. A spline function between the fourth interpolation point and the fifth interpolation point may be understood as a strong modification spline function, and a spline function between the fifth interpolation point and the sixth interpolation point may be understood as a weak modification spline function. The weak modification spline function is a transitional modification spline function between the strong modification spline function and the initial tone mapping curve. In addition, because the spline function between the fifth interpolation point and the sixth interpolation point is different from the initial tone mapping curve, the spline function between the fifth interpolation point and the sixth interpolation point has a curve modification function in addition to a transitional curve function.

Optionally, the plurality of interpolation points further include the sixth interpolation point, the target picture further includes bright region transition pixels, luminance values of the bright region transition pixels are less than or equal to the third preset threshold, and the determining a plurality of interpolation points based on luminance information of the target picture includes: determining the first coordinate value of the sixth interpolation point based on the quantity of the bright region transition pixels.

The bright region transition pixel is a pixel whose luminance is greater than the third preset threshold mentioned above. For example, if the third preset threshold is 20, it may be considered that a pixel whose value of a Y component in the YUV format is greater than 20 is a bright region transition pixel, or that a pixel whose value of an R/G/B component in the RGB format is greater than 20 is a bright region transition pixel. For another example, if the third preset threshold is 100 nits, it may be considered that a pixel whose luminance is greater than 100 nits is a bright region transition pixel. In some cases, luminance of the bright region transition pixel is greater than a sixth preset threshold, and the sixth preset threshold is less than the third preset threshold.

Optionally, the plurality of interpolation points further include the sixth interpolation point, the dynamic metadata includes Q pieces of coordinate information in a one-to-one correspondence with Q key pixels, Q is a positive integer, and when the plurality of interpolation points include the fourth interpolation point, the determining a plurality of interpolation points based on luminance information and dynamic metadata of the target picture includes: determining, based on the Q pieces of coordinate information and the luminance information of the target picture, that the Q key pixels are bright region transition pixels, where luminance values of the bright region pixels are less than or equal to the first preset threshold; and when the Q key pixels are the bright region pixels, determining that the plurality of interpolation points include the sixth interpolation point, where the first coordinate value of the sixth interpolation point is the same as the first coordinate value of the first endpoint.

The bright region transition pixel is a pixel whose luminance or average luminance is less than the third preset threshold mentioned above. For example, if the third preset threshold is 200, it may be considered that a pixel whose value of a Y component in the YUV format or average value is less than 200 is a bright region transition pixel, or that a pixel whose value of an R/G/B component in the RGB format or average value is less than 200 is a bright region transition pixel. For another example, if the third preset threshold is 400 nits, it may be considered that a pixel whose luminance or average luminance is less than 400 nits is a bright region transition pixel. In some cases, luminance of the bright region transition pixel is greater than a sixth preset threshold, and the sixth preset threshold is less than the third preset threshold.

When a quantity of bright region transition pixels is relatively large, or a proportion of bright region transition pixels to all the pixels is relatively high, the first coordinate value of the third interpolation point is close to the first coordinate value of the sixth interpolation point. When the quantity of the bright region transition pixels is relatively small, or the proportion of the bright region transition pixels to all the pixels is relatively low, the first coordinate value of the third interpolation point is far away from the first coordinate value of the sixth interpolation point. In other words, when the quantity of the bright region transition pixels is relatively large, the weak modification spline function is relatively short, but when the quantity of the bright region transition pixels is relatively small, the weak modification spline function is relatively long.

The bright region transition pixel may be understood as a pixel whose luminance is high and whose luminance is lower than that of a bright region pixel. The bright region transition pixel may be a key pixel indicated in the dynamic metadata. The bright region transition pixel may alternatively be determined by the electronic device autonomously based on luminance distribution of the pixels. In other words, the quantity of the bright region transition pixels in the target picture may be determined in different manners. The second coordinate value of the sixth interpolation point may be obtained based on an empirical value, a user input value, or the initial tone mapping curve.

Figure 7:
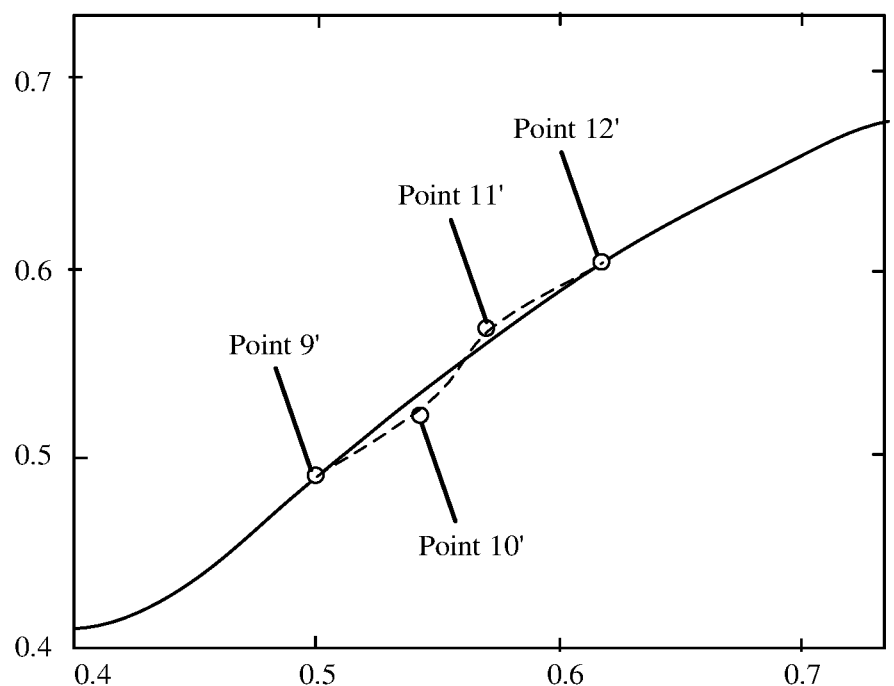
FIG. 7 is a schematic diagram of a spline function for modifying an initial tone mapping curve for a region with a weak luminance contrast according to an embodiment.

Scenario 3: The image includes pixels with relatively small luminance differences. FIG. 7 shows interpolation points and spline functions in this scenario.

Optionally, the target picture includes target pixels whose luminance values are between a first luminance value and a second luminance value, a proportion of the target pixels to all the pixels of the target picture is greater than an eighth preset threshold, a difference between the first luminance value and the second luminance value is less than a seventh preset threshold, the plurality of interpolation points include a twelfth interpolation point, and the determining a plurality of interpolation points based on luminance information of the target picture includes: determining the twelfth interpolation point based on average luminance of the target pixels, a minimum luminance value of the target picture, and a maximum luminance value of the target picture.

The luminance value may be expressed in YUV, RGB, or luminance.

For example, the maximum luminance value of the target picture is 500 nits and the minimum luminance value is 100 nits. It is assumed that the seventh preset threshold is 50 nits, and that the eighth preset threshold is 30%. Luminance values of 50% pixels in the target picture are within a range of 240-260 nits, that is, the first luminance value is 240 nits, the second luminance value is 260 nits, and a proportion of the target pixels to all the pixels of the target picture is 50%. It can be learned that the difference between the first luminance value and the second luminance value is less than the seventh preset threshold, and that the proportion of the target pixels to all the pixels of the target picture is greater than the eighth preset threshold.

It is assumed that the average luminance of the target pixels is 250 nits.

In an example, it may be determined that the first coordinate value of the twelfth interpolation point or the second coordinate value of the twelfth interpolation point is 250/(500-100), that is, $3/8$, or it may be determined that the first coordinate value of the twelfth interpolation point or the second coordinate value of the twelfth interpolation point is a value close to $3/8$. The twelfth interpolation point is, for example, a point 10' shown in FIG. 4. The second coordinate value of the twelfth interpolation point may be obtained based on an empirical value, a user input value, or the initial tone mapping curve.

In an example, it may be determined that the plurality of interpolation points include the twelfth interpolation point and a thirteenth interpolation point, where the first coordinate value of the twelfth interpolation point is less than $3/8$, and the first coordinate value of the thirteenth interpolation point is greater than 3/8, or the second coordinate value of the twelfth interpolation point is less than 3/8, and the second coordinate value of the thirteenth interpolation point is greater than 3/8. The twelfth interpolation point is, for example, a point 10' shown in FIG. 4. The thirteenth interpolation point may be, for example, a point 11' shown in FIG. 4. The second coordinate values of the twelfth interpolation point and the thirteenth interpolation point may be obtained based on an empirical value, a user input value, or the initial tone mapping curve.

Therefore, when the target picture includes a sufficient quantity of target pixels, it means that the display device may not be able to highlight a luminance contrast between the target pixels. To vividly display a target pixel, the initial tone mapping curve may be modified within a luminance range corresponding to the target pixel.

Optionally, the dynamic metadata includes coordinate information of the target pixel.

In other words, the target pixel may be a pixel indicated in the dynamic metadata or may be determined by the electronic device autonomously based on luminance distribution of the pixels. In other words, whether the target picture includes a target pixel may be determined in different manners.

Next, the modification range of the initial tone mapping curve needs to be determined. The thirteenth interpolation point may be determined, or a range between the twelfth interpolation point and the thirteenth interpolation point may be determined, so that the initial tone mapping curve between the twelfth interpolation point and the thirteenth interpolation point is modified, to ensure a display of the picture on the display device. As shown in FIG. 4, the thirteenth interpolation point may be a point 11' in FIG. 4.

Optionally, the plurality of interpolation points further include the thirteenth interpolation point, and the determining a plurality of interpolation points based on luminance information of the target picture includes: determining the thirteenth interpolation point based on the quantity of the target pixels.

When the quantity of the target pixels is relatively large, or the proportion of the target pixels to all the pixels is relatively high, a distance between the twelfth interpolation point and the thirteenth interpolation point is relatively short. When the quantity of the target pixels is relatively small, or the proportion of the target pixels to all the pixels is relatively low, the distance between the twelfth interpolation point and the thirteenth interpolation point is relatively long. In other words, when the quantity of the target pixels is relatively large, the modification range of the initial tone mapping curve is relatively small, but when the quantity of the target pixels is relatively small, the modification range of the initial tone mapping curve is relatively large. The second coordinate value of the thirteenth interpolation point may be obtained based on an empirical value, a user input value, or the initial tone mapping curve.

In addition, a modified tone mapping curve needs to be smooth and derivable. Therefore, a fourteenth interpolation point may be determined, so that the spline function for modifying the initial tone mapping curve can be smoothly connected to the initial tone mapping curve at the fourteenth interpolation point.

Optionally, the plurality of interpolation points further include the fourteenth interpolation point, the fourteenth interpolation point is an intersection point at which the spline function and the initial tone mapping curve transition smoothly, the target picture further includes target transition pixels, luminance values of the target transition pixels are less than or equal to the first luminance value, or luminance values of the target transition pixels are greater than or equal to the second luminance value, the first luminance value is less than the second luminance value, and the determining a plurality of interpolation points based on luminance information of the target picture includes: determining the first coordinate value of the fourteenth interpolation point based on a quantity of the target transition pixels.

In an example, the target transition pixel may be a pixel whose luminance is higher than that of a target pixel. In this case, the first coordinate value of the fourteenth interpolation point is greater than the first coordinate value of the twelfth interpolation point and greater than the first coordinate value of the thirteenth interpolation point. As shown in FIG. 4, the fourteenth interpolation point may be a point 12' in FIG. 4.

In an example, the target transition pixel may be a pixel whose luminance is lower than that of a target pixel. In this case, the first coordinate value of the fourteenth interpolation point is less than the first coordinate value of the twelfth interpolation point and less than the first coordinate value of the thirteenth interpolation point. As shown in FIG. 4, the fourteenth interpolation point may be a point 9' in FIG. 4.

When the quantity of the target transition pixels is relatively large, or a proportion of the target transition pixels to all the pixels is relatively high, a distance between the thirteenth interpolation point and the fourteenth interpolation point is relatively short. When the quantity of the target transition pixels is relatively small, or the proportion of the target transition pixels to all the pixels is relatively low, the distance between the thirteenth interpolation point and the fourteenth interpolation point is relatively long. In other words, when the quantity of the target transition pixels is relatively large, the modification range of the initial tone mapping curve is relatively small, but when the quantity of the target pixels is relatively small, the modification range of the initial tone mapping curve is relatively large. The second coordinate value of the fourteenth interpolation point may be obtained based on an empirical value, a user input value, or the initial tone mapping curve.

Optionally, the dynamic metadata includes coordinate information of the target transition pixel.

In other words, the target transition pixel may be a pixel indicated in the dynamic metadata or may be determined by the electronic device autonomously based on luminance distribution of the pixels. In other words, whether the target picture includes a target transition pixel may be determined in different manners.

Optionally, the dynamic metadata includes coordinate information of each of the plurality of interpolation points.

The coordinate information of the interpolation point may be coordinates of the interpolation point or may be the first coordinate value or the second coordinate value of the interpolation point. The coordinates of the interpolation point may be expressed as (x, y), where x may represent the first coordinate value, and y may represent the second coordinate value. The electronic device may determine the plurality of interpolation points based on the luminance information of the image, or based on the dynamic metadata of the image, or based on the luminance information of the image and the dynamic metadata of the image. For example, the electronic device determines the first coordinate value of the interpolation point 1, the second coordinate value of the interpolation point 2, and coordinates of the interpolation point 3.

For example, the dynamic metadata includes the first coordinate value of a point 1', coordinates of a point 2', and the second coordinate value of the point 4' in FIG. 4. Based on the first coordinate value of the point 1' given in the dynamic metadata, it may be determined that the point 1' may be a point coincident with the point 1 or coincident with an origin. In this way, coordinates of the point 1' are learned. In addition, the coordinates of the point 2' are given in the dynamic metadata. Moreover, based on the second coordinate value of the point 4' given in the dynamic metadata, a point whose vertical coordinate is the same as the second coordinate value may be found on an initial tone mapping function, and it is determined that a horizontal coordinate of the point is the first coordinate value of the point 4'. In this way, coordinates of the point 4' are learned. A common method for determining a spline function may be used to obtain a spline function passing through the point 1', the point 2', and the point 4'.

For another example, the dynamic metadata includes the first coordinate value of a point 5', coordinates of a point 6', and the second coordinate value of a point 8' in FIG. 4. Based on the first coordinate value of the point 5' given in the dynamic metadata, it may be determined that the point 5' may be a point coincident with the point 5 or coincident with (1, 1). In this way, coordinates of the point 5' are learned. In addition, the coordinates of the point 6' are given in the dynamic metadata. Moreover, based on the second coordinate value of the point 8' given in the dynamic metadata, the first coordinate value of the point 8' may be determined on the initial tone mapping function, and coordinates of the point 8' may be learned. A common method for determining a spline function may be used to obtain a spline function passing through the point 5', the point 6', and the point 8'.

For another example, the dynamic metadata includes the second coordinate value of the point 9', coordinates of the point 10', and the first coordinate value of the point 12' in FIG. 4. Based on the second coordinate value of the point 9' given in the dynamic metadata, the first coordinate value of the point 12' may be determined on the initial tone mapping function, and coordinates of the point 12' may be learned. In addition, the coordinates of the point 10' are given in the dynamic metadata. Moreover, based on the first coordinate value of the point 12' given in the dynamic metadata, the second coordinate value of the point 12' may be determined on the initial tone mapping function, and coordinates of the point 12' may be learned. A common method for determining a spline function may be used to obtain a spline function passing through the point 9', the point 10', and the point 12'.

203: Determine a spline function that passes through the plurality of interpolation points, where the spline function is smoothly connected to the initial tone mapping curve at at least one of the plurality of interpolation points.

The spline function is a piecewise polynomial. A spline function $S(x)$ in an interval $[a, b]$ is defined to be continuous in the interval $[a, b]$, and a first-order derivative $S'(x)$ and a second-order derivative $S''(x)$ of the spline function are both continuous in the interval $[a, b]$. FIG. 4 shows a spline function 1 passing through the point 1', the point 2', and the point 4', a spline function 2 passing through the point 5', the point 6', and the point 8', and a spline function 3 passing through the point 9', the point 10', and the point 12'.

After the plurality of interpolation points are determined, the spline function passing through the plurality of interpolation points may be obtained based on coordinates of each of the plurality of interpolation points. For the spline function 1 in FIG. 4, the plurality of interpolation points are the point 1', the point 2', and the point 4'. For the spline function 2 in FIG. 4, the plurality of interpolation points are the point 5', the point 6', and the point 8'. For the spline function 3 in FIG. 4, the plurality of interpolation points are the point 9', the point 10', and the point 12'.

The interval $[a, b]$ includes n nodes $x_1, \ldots, x_n$, where $a < x_1 < \ldots < x_n$. When the spline function is an N-power spline function, a function in an interval $[x_k, x_{k+1}]$ between any two adjacent nodes is an N-power polynomial function, where $k \leq n-1$ and k is a positive integer.

When the spline function includes the spline function 1 and the spline function 2, the spline function 1 may be an M-power spline function in an interval $[x_{M1}, x_{M2}]$, and the spline function 2 may be an L-power spline function in an interval $[x_{L1}, x_{L2}]$. An intersection set of the interval $[x_{M1}, x_{M2}]$ and the interval $[x_{L1}, x_{L2}]$ is empty, or an intersection set of the interval $[x_{M1}, x_{M2}]$ and the interval $[x_{L1}, x_{L2}]$ includes only one value. M may be the same as or different from L.

When the spline function includes a linear spline function, at least two known conditions are required to determine the linear spline function. For example, coordinates of points passing through the linear spline function and a slope of the spline function are learned in advance. For another example, coordinates of two points passing through the linear spline function are learned in advance.

When the spline function includes a quadratic spline function, at least three known conditions are required to determine the quadratic spline function. For example, a function form of the quadratic spline function is $y=ax^2+bx+c$, and $a \neq 0$. To determine the quadratic spline function, coordinates of three points passing through the quadratic spline function need to be learned in advance. Alternatively, coordinates of two points and a derivative of the quadratic spline function at one point are learned in advance.

When the spline function includes a cubic spline function, at least four known conditions are required to determine the cubic spline function. For example, a function form of the cubic spline function is $y=ax^3+bx^2+cx+d$, and $a \neq 0$. To determine the cubic spline function, coordinates of four points passing through the cubic spline function need to be learned in advance. Alternatively, coordinates of two points and derivatives of the cubic spline function at the two points are learned in advance.

When the spline function includes an N-power spline function, at least N+1 known conditions are required to determine the N-power spline function.

Assuming that the initial tone mapping curve is $T(x)$, the spline function $S(x)$ is defined in the interval $[a, b]$.

In an example, the spline function $S(x)$ may be smoothly connected to the initial tone mapping curve $T(x)$ when $x=a$, or may be smoothly connected to the initial tone mapping curve $T(x)$ when $x=b$, or may be smoothly connected to the initial tone mapping curve $T(x)$ when $x=a$ and when $x=b$.

In an example, the plurality of interpolation points include a point whose first coordinate value is $x_0$, where $a < x_0 < b$, and the spline function $S(x)$ may be smoothly connected to the initial tone mapping curve $T(x)$ when $x=x_0$.

The spline function $S(x)$ is smoothly connected to the initial tone mapping curve $T(x)$ when $x=a$, that is, $S(a)=T(a)$, and $S'(a)=T'(a)$.

The spline function $S(x)$ is smoothly connected to the initial tone mapping curve $T(x)$ when $x=b$, that is, $S(b)=T(b)$, and $S'(b)=T'(b)$.

The spline function $S(x)$ is smoothly connected to the initial tone mapping curve $T(x)$ when $x=x_0$, that is, $S(x_0)=T(x_0)$, and $S'(x_0)=T'(x_0)$.

The spline function is smoothly connected to the initial tone mapping curve at an interpolation point, and an objective of the smooth connection is to replace a part of the initial tone mapping curve with the spline function, so that a modified tone mapping curve can be obtained. Because the spline function is smoothly connected to the initial tone mapping curve at the interpolation point, the modified tone mapping curve may be a smooth function.

Optionally, the plurality of interpolation points include a seventh interpolation point, an eighth interpolation point, and a ninth interpolation point, the initial tone mapping curve passes through the ninth interpolation point, and the determining a spline function that passes through the plurality of interpolation points includes: obtaining a first spline function that passes through the seventh interpolation point and the eighth interpolation point; and determining a second spline function that passes through the eighth interpolation point and the ninth interpolation point, where the second spline function is smoothly connected to the first spline function at the eighth interpolation point, and the second spline function is smoothly connected to the initial tone mapping curve at the ninth interpolation point.

In the foregoing scenario 1, scenario 2, and scenario 3, the spline function may include the first spline function and the second spline function, the first spline function is a strong modification spline function, and the second spline function is used to implement a smooth transition between the first spline function and the initial luminance mapping curve.

Obtaining the first spline function may be determining the first spline function by receiving a parameter input by a user, or by using a preset parameter. For example, the first spline function is preset as a linear spline function, and a slope of the linear spline function is 1.

Optionally, the first spline function may be further determined with reference to coordinates of the seventh interpolation point and/or the eighth interpolation point.

The first spline function may alternatively be a quadratic spline function or a cubic spline function. The first spline function is determined with reference to the foregoing conditions required to determine the quadratic spline function or the cubic spline function.

In other words, when the first spline function is determined, in addition to the obtained data, some empirical values or user indications may be introduced to determine the first spline function.

Then the second spline function used to smoothly connect the first spline function to the initial tone mapping curve is determined. The first spline function is determined before the second spline function is determined. Therefore, a function value of the first spline function at the eighth interpolation point is known, and a derivative value of the first spline function at the eighth interpolation point is known. That the second spline function is smoothly connected to the first spline function at the eighth interpolation point means that the function value of the first spline function at the eighth interpolation point is the same as a function value of the second spline function at the eighth interpolation point, and that the derivative value of the first spline function at the eighth interpolation point is the same as a derivative value of the second spline function at the eighth interpolation point. In addition, a function value of the initial tone mapping function at the ninth interpolation point is known, and a derivative value of the initial tone mapping function at the ninth interpolation point is known. That the second spline function is smoothly connected to the initial tone mapping curve at the ninth interpolation point means that a function value of the second spline function at the ninth interpolation point is the same as the function value of the initial tone mapping function at the ninth interpolation point, and that a derivative value of the second spline function at the ninth interpolation point is the same as the derivative value of the initial tone mapping function at the ninth interpolation point.

For ease of description, unless otherwise specified, the "derivative value" may be understood as a first-order derivative value.

Optionally, the first spline function is a linear spline function, and the second spline function is a cubic spline function.

Optionally, a derivative of the spline function is always greater than 0.

In other words, a derivative of the spline function at every point is always greater than 0. With this restriction, an excessively large difference between a finally obtained spline function and the initial tone mapping curve can be avoided, and an excessive modification is avoided.

Optionally, a derivative of the first spline function is always greater than 0.

In other words, a derivative of the first spline function at every point is always greater than 0. With this restriction, an excessively large difference between a finally obtained first spline function and the initial tone mapping curve can be avoided, and an excessive modification is avoided.

Optionally, a derivative of the second spline function is always greater than 0.

In other words, a derivative of the second spline function at every point is always greater than 0. With this restriction, an excessively large difference between a finally obtained second spline function and the initial tone mapping curve can be avoided, and an excessive modification is avoided.

Optionally, the plurality of interpolation points further include an eleventh interpolation point, the first spline function passes through the eleventh interpolation point, and a second-order derivative of the first spline function at the eleventh interpolation point is 0.

The point whose second-order derivative is 0 may be an inflection point of the first spline function. For example, the first spline function increases rapidly on one side of the eleventh interpolation point and increases at a reduced speed on the other side of the eleventh interpolation point.

Optionally, the plurality of interpolation points further include an eleventh interpolation point, the second spline function passes through the eleventh interpolation point, and a second-order derivative of the second spline function at the eleventh interpolation point is 0.

The point whose second-order derivative is 0 may be an inflection point of the second spline function. For example, the second spline function increases rapidly on one side of the eleventh interpolation point and increases at a reduced speed on the other side of the eleventh interpolation point. As shown in FIG. 4, the eleventh interpolation point may be a point 3'.

Optionally, the plurality of interpolation points further include a fifteenth interpolation point, the first spline function passes through the fifteenth interpolation point, and the initial tone mapping function passes through the fifteenth interpolation point.

On one side of the fifteenth interpolation point, the first spline function is located above the initial tone mapping function, and on the other side of the fifteenth interpolation point, the first spline function is located below the initial tone mapping function. By defining a location of the fifteenth interpolation point, a modification manner of the initial tone mapping function may be defined.

Optionally, the plurality of interpolation points further include a fifteenth interpolation point, the second spline function passes through the fifteenth interpolation point, and the initial tone mapping function passes through the fifteenth interpolation point.

On one side of the fifteenth interpolation point, the second spline function is located above the initial tone mapping function, and on the other side of the fifteenth interpolation point, the second spline function is located below the initial tone mapping function. By defining a location of the fifteenth interpolation point, a modification manner of the initial tone mapping function may be defined.

Scenario 1

When the image is dark, a part of the initial tone mapping curve that is close to the first endpoint may be modified. The seventh interpolation point may be the foregoing first interpolation point, the eighth interpolation point may be the foregoing second interpolation point, and the ninth interpolation point may be the foregoing third interpolation point. In this scenario, the spline function includes a first spline function that passes through the first interpolation point and the second interpolation point and a second spline function that passes through the second interpolation point and the third interpolation point, where the first spline function is a strong modification spline function, and the second spline function is used to implement a smooth transition between the first spline function and the initial luminance mapping curve. Locations of the interpolation points and spline functions are shown in FIG. 5.

The foregoing has described how to obtain the first coordinate values of the first interpolation point, the second interpolation point, and the third interpolation point. In other words, the first coordinate value of the seventh interpolation point, the first coordinate value of the eighth interpolation point, and the first coordinate value of the ninth interpolation point are all known.

First, the first spline function $f_1(x)$ that passes through the seventh interpolation point and the eighth interpolation point (that is, passing through the point 1' and the point 2' in FIG. 4) are obtained.

For example, the first spline function is preset as a linear spline function, and a slope of the linear spline function is 1. Because the first coordinate value of the seventh interpolation point is the same as the first coordinate value of the first endpoint of the initial tone mapping function, it may be determined that the first spline function is a function passing through the origin, that is, coordinates of the seventh interpolation point are (0, 0). Therefore, the first spline function may be expressed as $f_1(x)=x$.

Then the second spline function $f_2(x)$ that passes through the eighth interpolation point and the ninth interpolation point (in this embodiment, the eighth interpolation point is the point 2' in FIG. 4, and the ninth interpolation point is the point 4' in FIG. 4) are determined.

Based on the first spline function $f_1(x)$ and the first coordinate value $x_2$ of the eighth interpolation point, it may be determined that a function of the first spline function at the eighth interpolation point is $f_1(x_2)$, and that a derivative of the first spline function at the eighth interpolation point is $f_1'(x_2)$.

Based on the initial tone mapping function $f_0(x)$ and the first coordinate value $x_4$ of the ninth interpolation point, it may be determined that a function of the second spline function at the ninth interpolation point is $f_0(x_4)$, and that a derivative of the first spline function at the ninth interpolation point is $f_0'(x_4)$.

Based on $f_1(x_2)=f_2(x_2)$, $f_1'(x_2)=f_2'(x_2)$, $f_0(x_4)=f_2(x_4)$, and $f_0'(x_4)=f_2'(x_4)$, the second spline function $f_2(x)$ is determined.

Optionally, the second spline function is a cubic spline function.

Optionally, the plurality of interpolation points further include an eleventh interpolation point, the first spline function passes through the eleventh interpolation point, and a second-order derivative of the first spline function at the eleventh interpolation point is 0.

Optionally, the plurality of interpolation points further include an eleventh interpolation point, the second spline function passes through the eleventh interpolation point, and a second-order derivative of the second spline function at the eleventh interpolation point is 0. The eleventh interpolation point may be a point 3' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the first spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the second spline function at the fifteenth interpolation point is different from a derivative value of the initial tone mapping function at the fifteenth interpolation point. The fifteenth interpolation point may be a point 3' shown in FIG. 4.

Scenario 2

When the image is bright, a part of the initial tone mapping curve that is close to the second endpoint may be modified. In this case, the seventh interpolation point may be the foregoing fourth interpolation point, the eighth interpolation point may be the foregoing fifth interpolation point, and the ninth interpolation point may be the foregoing sixth interpolation point. In this scenario, the spline function includes a first spline function that passes through the fourth interpolation point and the fifth interpolation point and a second spline function that passes through the fifth interpolation point and the sixth interpolation point, where the first spline function is a strong modification spline function, and the second spline function is used to implement a smooth transition between the first spline function and the initial luminance mapping curve. Locations of the interpolation points and spline functions are shown in FIG. 6.

The foregoing has described how to obtain the first coordinate values of the fourth interpolation point, the fifth interpolation point, and the sixth interpolation point. In other words, the first coordinate value of the seventh interpolation point, the first coordinate value of the eighth interpolation point, and the first coordinate value of the ninth interpolation point are all known.

First, the first spline function $f_1(x)$ that passes through the seventh interpolation point and the eighth interpolation point (that is, passing through the point 5' and the point 6' in FIG. 4) are obtained.

For example, the first spline function is preset as a linear spline function, and a slope of the linear spline function is 1. Because the first coordinate value of the seventh interpolation point is the same as the first coordinate value of the first endpoint of the initial tone mapping function, it may be determined that the first spline function is a function passing through (1, 1), that is, coordinates of the seventh interpolation point are (1, 1). Therefore, the first spline function may be expressed as $f_1(x)=x$.

Then the second spline function $f_2(x)$ that passes through the eighth interpolation point and the ninth interpolation point (that is, passing through the point 6' and the point 8' in FIG. 4) is determined.

Based on the first spline function $f_1(x)$ and the first coordinate value $x_6$ of the eighth interpolation point, it may be determined that a function of the first spline function at the eighth interpolation point is $f_1(x_6)$, and that a derivative of the first spline function at the eighth interpolation point is $f_1'(x_6)$.

Based on the initial tone mapping function $f_0(x)$ and the first coordinate value $x_8$ of the ninth interpolation point, it may be determined that a function of the second spline function at the ninth interpolation point is $f_0(x_8)$, and that a derivative of the first spline function at the ninth interpolation point is $f_0'(x_8)$.

Based on $f_1(x_6)=f_2(x_6)$, $f_1'(x_6)=f_2'(x_6)$, $f_0(x_8)=f_2(x_8)$, and $f_0'(x_8)=f_2'(x_8)$, the second spline function $f_2(x)$ is determined.

Optionally, the second spline function is a cubic spline function.

Optionally, the plurality of interpolation points further include an eleventh interpolation point, the first spline function passes through the eleventh interpolation point, and a second-order derivative of the first spline function at the eleventh interpolation point is 0.

Optionally, the plurality of interpolation points further include an eleventh interpolation point, the second spline function passes through the eleventh interpolation point, and a second-order derivative of the second spline function at the eleventh interpolation point is 0. The eleventh interpolation point may be a point 7' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the first spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the second spline function at the fifteenth interpolation point is different from a derivative value of the initial tone mapping function at the fifteenth interpolation point. The fifteenth interpolation point may be the point 7' shown in FIG. 4.

Scenario 3

Figure 8:
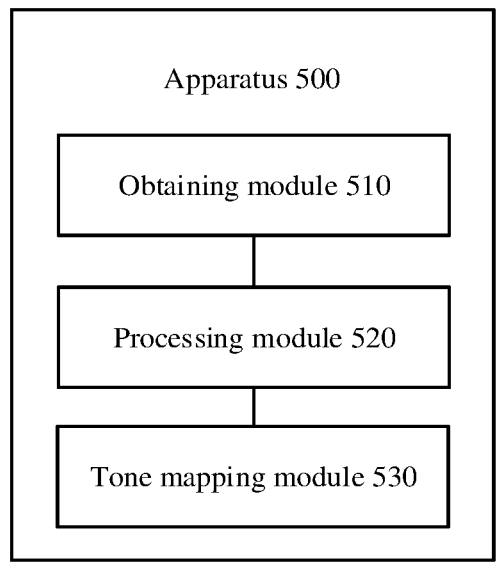
FIG. 8 is a structural diagram of an image processing apparatus according to an embodiment.

The seventh interpolation point may be the foregoing twelfth interpolation point, the eighth interpolation point may be the foregoing thirteenth interpolation point, and the ninth interpolation point may be the foregoing fourteenth interpolation point. In this scenario, the spline function includes a first spline function that passes through the twelfth interpolation point and the thirteenth interpolation point and a second spline function that passes through the thirteenth interpolation point and the fourteenth interpolation point, where the first spline function is a strong modification spline function, and the second spline function is used to implement a smooth transition between the first spline function and the initial luminance mapping curve. Locations of the interpolation points and spline functions are shown in FIG. 8.

The foregoing has described how to obtain the first coordinate values of the twelfth interpolation point, the thirteenth interpolation point, and the fourteenth interpolation point. In other words, the first coordinate value of the seventh interpolation point, the first coordinate value of the eighth interpolation point, and the first coordinate value of the ninth interpolation point are all known.

First, the first spline function $f_1(x)$ that passes through the seventh interpolation point and the eighth interpolation point (that is, passing through the point 10' and the point 11' in FIG. 4) are obtained.

For example, the first spline function is preset as a linear spline function, and a slope of the linear spline function is 1. Because the seventh interpolation point is located below the initial tone mapping function, and the eighth interpolation point is located above the initial tone mapping function, assuming that the first coordinate value of the seventh interpolation point is $x_{10}$, and that the first coordinate value of the eighth interpolation point is $x_{11}$, the first spline function passes through $$\left(\frac{x_{10}+x_{11}}{2}, f_0\left(\frac{x_{10}+x_{11}}{2}\right)\right),$$

and the initial tone mapping function is $f_0(x)$. Therefore, $$f_1(x) = x + f_0\left(\frac{x_{10}+x_{11}}{2}\right) - \frac{x_{10}+x_{11}}{2}.$$

Then the second spline function $f_2(x)$ that passes through the eighth interpolation point and the ninth interpolation point (that is, passing through the point 11' and the point 12' in FIG. 4, or passing through the point 10' and the point 9' in FIG. 4) is determined.

Based on the first spline function $f_1(x)$ and the first coordinate value $x_{11}$ of the eighth interpolation point, it may be determined that a function of the first spline function at the eighth interpolation point is $f_1(x_{11})$, and that a derivative of the first spline function at the eighth interpolation point is $f_1'(x_{11})$.

Based on the initial tone mapping function $f_0(x)$ and the first coordinate value $x_{12}$ of the ninth interpolation point, it may be determined that a function of the second spline function at the ninth interpolation point is $f_0(x_{12})$, and that a derivative of the first spline function at the ninth interpolation point is $f_0'(x_{12})$.

Based on $f_1(x_{11})=f_2(x_{11})$, $=f_2'(x_{11})$, $f_0(x_{12})=f_2(x_{12})$, and $f_0'(x_{12})=f_2'(x_{12})$, the second spline function $f_2(x)$ is determined.

Optionally, the second spline function is a cubic spline function.

Optionally, the plurality of interpolation points further include an eleventh interpolation point, the first spline function passes through the eleventh interpolation point, and a second-order derivative of the first spline function at the eleventh interpolation point is 0.

Optionally, the plurality of interpolation points further include an eleventh interpolation point, the second spline function passes through the eleventh interpolation point, and a second-order derivative of the second spline function at the eleventh interpolation point is 0. The eleventh interpolation point may be a point 13' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the first spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the second spline function at the fifteenth interpolation point is different from a derivative value of the initial tone mapping function at the fifteenth interpolation point. The fifteenth interpolation point may be a point 13' shown in FIG. 4.

Optionally, the plurality of interpolation points include a seventh interpolation point, an eighth interpolation point, and a ninth interpolation point, the spline function includes a third spline function that passes through the seventh interpolation point, the eighth interpolation point, and the ninth interpolation point, the first coordinate value of the eighth interpolation point is between the first coordinate value of the seventh interpolation point and the first coordinate value of the ninth interpolation point, and the first coordinate value of the eighth interpolation point is a first modification position; before the determining a plurality of interpolation points, the method further includes: obtaining a first offset, where the first offset is used to represent a modification range of the initial tone mapping curve at the first modification position, and the first modification position is the first coordinate value of the eighth interpolation point; the determining a plurality of interpolation points includes: determining the second coordinate value of the eighth interpolation point based on a function value of the initial tone mapping curve at the first modification position and the first offset; and the determining a spline function that passes through the plurality of interpolation points includes: determining the third spline function based on the first coordinate value of the eighth interpolation point and the second coordinate value of the eighth interpolation point, where the third spline function is smoothly connected to the initial tone mapping curve at the seventh interpolation point and/or the ninth interpolation point. Obtaining the first offset may be receiving a parameter input by the user or may be using a preset parameter. For example, the first offset is preset to 0.01.

The first coordinate value of the eighth interpolation point corresponds to the first modification position. The eighth interpolation point that deviates from the initial tone mapping function is determined at the first modification position, that is, the second coordinate value of the eighth interpolation point is not equal to the function value of the initial tone mapping function at the first modification position.

The first offset may be an offset degree of the eighth interpolation point relative to the initial tone mapping function. When the first offset is positive, the eighth interpolation point is located above the initial tone mapping function. When the first offset is negative, the eighth interpolation point is located below the initial tone mapping function.

For example, Second coordinate value of the eighth interpolation point=First offset+Function value of the initial tone mapping function at the first modification position.

For example, Shortest distance from the eighth interpolation point to the initial tone mapping function=First offset.

Therefore, coordinates of the eighth interpolation point may be determined based on the first offset.

Then the third spline function is determined.

In an example, the third spline function is smoothly connected to the initial tone mapping curve at the seventh interpolation point and the ninth interpolation point. It may be considered that both the seventh interpolation point and the ninth interpolation point are points on the initial tone mapping function. Therefore, coordinates of the seventh interpolation point and coordinates of the ninth interpolation point can be obtained. In addition, a derivative of the third spline function at the seventh interpolation point is equal to a derivative of the initial tone mapping function at the seventh interpolation point, and a derivative of the third spline function at the ninth interpolation point is equal to a derivative of the initial tone mapping function at the ninth interpolation point. Due to an attribute of the spline function itself, the third spline function at the eighth interpolation point is continuous, a first-order derivative of the third spline function at the eighth interpolation point is continuous, and a second-order derivative of the third spline function at the eighth interpolation point is continuous. Therefore, the third spline function may be divided into a fourth spline function that passes through the seventh interpolation point and the eighth interpolation point, and a fifth spline function that passes through the eighth interpolation point and the ninth interpolation point. A function value of the fourth spline function at the eighth interpolation point is the same as a function value of the fifth spline function at the eighth interpolation point. A first-order derivative value of the fourth spline function at the eighth interpolation point is the same as a first-order derivative value of the fifth spline function at the eighth interpolation point. A second-order derivative value of the fourth spline function at the eighth interpolation point is the same as a second-order derivative value of the fifth spline function at the eighth interpolation point.

In the foregoing scenario 1, scenario 2, and scenario 3, spline functions that pass through a plurality of interpolation points are collectively referred to as the third spline function, and the plurality of interpolation points in the three scenarios include the seventh interpolation point, the eighth interpolation point, and the ninth interpolation point. The spline function that passes through the seventh interpolation point and the eighth interpolation point is the fourth spline function, and the spline function that passes through the eighth interpolation point and the ninth interpolation point is the fifth spline function.

Optionally, a derivative of the fourth spline function is always greater than 0.

In other words, a derivative of the fourth spline function at every point is always greater than 0. With this restriction, an excessively large difference between a finally obtained first spline function and the initial tone mapping curve can be avoided, and an excessive modification is avoided.

Optionally, a derivative of the fifth spline function is always greater than 0.

In other words, a derivative of the fifth spline function at every point is always greater than 0. With this restriction, an excessively large difference between a finally obtained second spline function and the initial tone mapping curve can be avoided, and an excessive modification is avoided.

Optionally, the plurality of interpolation points further include an eleventh interpolation point, the fourth spline function passes through the eleventh interpolation point, and a second-order derivative of the fourth spline function at the eleventh interpolation point is 0.

The point whose second-order derivative is 0 may be an inflection point of the fourth spline function. For example, the fourth spline function increases rapidly on one side of the eleventh interpolation point and increases at a reduced speed on the other side of the eleventh interpolation point. As shown in FIG. 4, the eleventh interpolation point may be a point 3'.

Optionally, the plurality of interpolation points further include an eleventh interpolation point, the fifth spline function passes through the eleventh interpolation point, and a second-order derivative of the second spline function at the eleventh interpolation point is 0.

The point whose second-order derivative is 0 may be an inflection point of the fifth spline function. For example, the fifth spline function increases rapidly on one side of the eleventh interpolation point and increases at a reduced speed on the other side of the eleventh interpolation point. As shown in FIG. 4, the eleventh interpolation point may be a point 3'.

Optionally, the plurality of interpolation points further include a fifteenth interpolation point, the fourth spline function passes through the fifteenth interpolation point, and the initial tone mapping function passes through the fifteenth interpolation point.

On one side of the fifteenth interpolation point, the fourth spline function is located above the initial tone mapping function, and on the other side of the fifteenth interpolation point, the fourth spline function is located below the initial tone mapping function. By defining a location of the fifteenth interpolation point, a modification manner of the initial tone mapping function may be defined.

Optionally, the plurality of interpolation points further include a fifteenth interpolation point, the fifth spline function passes through the fifteenth interpolation point, and the initial tone mapping function passes through the fifteenth interpolation point.

On one side of the fifteenth interpolation point, the fifth spline function is located above the initial tone mapping function, and on the other side of the fifteenth interpolation point, the fifth spline function is located below the initial tone mapping function. By defining a location of the fifteenth interpolation point, a modification manner of the initial tone mapping function may be defined.

Optionally, the plurality of interpolation points further include a tenth interpolation point, the third spline function passes through the tenth interpolation point, and the first coordinate value of the tenth interpolation point is between the first coordinate value of the seventh interpolation point and the first coordinate value of the ninth interpolation point; before the determining a plurality of interpolation points, the method further includes: obtaining a second offset, where the second offset is used to represent a modification range of the initial tone mapping curve at a second modification position, and the second modification position is the first coordinate value of the tenth interpolation point; the determining a plurality of interpolation points further includes: determining the second coordinate value of the tenth interpolation point based on a function value of the initial tone mapping curve at the second modification position and the second offset; and the determining the third spline function based on the first coordinate value of the eighth interpolation point and the second coordinate value of the eighth interpolation point includes: determining the third spline function based on the first coordinate value and the second coordinate value of the eighth interpolation point, and the first coordinate value and the second coordinate value of the tenth interpolation point, where the third spline function is smoothly connected to the initial tone mapping curve at both the seventh interpolation point and the ninth interpolation point.

Obtaining the second offset may be receiving a parameter input by the user or may be using a preset parameter. For example, the second offset is preset to 0.01.

The first coordinate value of the tenth interpolation point corresponds to the second modification position. The tenth interpolation point that deviates from the initial tone mapping function is determined at the second modification position, that is, the second coordinate value of the tenth interpolation point is not equal to the function value of the initial tone mapping function at the second modification position.

The second offset may be an offset degree of the tenth interpolation point relative to the initial tone mapping function. When the second offset is positive, the tenth interpolation point is located above the initial tone mapping function. When the second offset is negative, the tenth interpolation point is located below the initial tone mapping function.

For example, Second coordinate value of the tenth interpolation point=Second offset+Function value of the initial tone mapping function at the second modification position.

For example, Shortest distance from the tenth interpolation point to the initial tone mapping function=Second offset.

Optionally, the first offset and the second offset are mutually opposite numbers.

Therefore, coordinates of the tenth interpolation point may be determined based on the second offset.

Then the third spline function is further determined. Due to an attribute of the spline function itself, the third spline function at the tenth interpolation point is continuous, a first-order derivative of the third spline function at the tenth interpolation point is continuous, and a second-order derivative of the third spline function at the tenth interpolation point is continuous. Therefore, the third spline function may be divided into a sixth spline function that passes through the seventh interpolation point and the tenth interpolation point, and a seventh spline function that passes through the tenth interpolation point and the ninth interpolation point. A function value of the sixth spline function at the tenth interpolation point is the same as a function value of the seventh spline function at the tenth interpolation point. A first-order derivative value of the sixth spline function at the tenth interpolation point is the same as a first-order derivative value of the seventh spline function at the tenth interpolation point. A second-order derivative value of the sixth spline function at the tenth interpolation point is the same as a second-order derivative value of the seventh spline function at the tenth interpolation point.

Optionally, a derivative of the sixth spline function is always greater than 0.

In other words, a derivative of the sixth spline function at every point is always greater than 0. With this restriction, an excessively large difference between a finally obtained first spline function and the initial tone mapping curve can be avoided, and an excessive modification is avoided.

Optionally, a derivative of the seventh spline function is always greater than 0.

In other words, a derivative of the seventh spline function at every point is always greater than 0. With this restriction, an excessively large difference between a finally obtained second spline function and the initial tone mapping curve can be avoided, and an excessive modification is avoided.

Optionally, the plurality of interpolation points further include an eleventh interpolation point, the sixth spline function passes through the eleventh interpolation point, and a second-order derivative of the second spline function at the eleventh interpolation point is 0.

The point whose second-order derivative is 0 may be an inflection point of the sixth spline function. For example, the sixth spline function increases rapidly on one side of the eleventh interpolation point and increases at a reduced speed on the other side of the eleventh interpolation point. As shown in FIG. 4, the eleventh interpolation point may be a point 3'.

Optionally, the plurality of interpolation points further include an eleventh interpolation point, the seventh spline function passes through the eleventh interpolation point, and a second-order derivative of the second spline function at the eleventh interpolation point is 0.

The point whose second-order derivative is 0 may be an inflection point of the seventh spline function. For example, the seventh spline function increases rapidly on one side of the eleventh interpolation point and increases at a reduced speed on the other side of the eleventh interpolation point. As shown in FIG. 4, the eleventh interpolation point may be a point 3'.

Optionally, the plurality of interpolation points further include a fifteenth interpolation point, the fourth spline function passes through the fifteenth interpolation point, and the initial tone mapping function passes through the fifteenth interpolation point. A derivative value of the fourth spline function at the fifteenth interpolation point is different from a derivative value of the initial tone mapping function at the fifteenth interpolation point.

On one side of the fifteenth interpolation point, the fourth spline function is located above the initial tone mapping function, and on the other side of the fifteenth interpolation point, the fourth spline function is located below the initial tone mapping function. By defining a location of the fifteenth interpolation point, a modification manner of the initial tone mapping function may be defined.

Optionally, the plurality of interpolation points further include a fifteenth interpolation point, the fifth spline function passes through the fifteenth interpolation point, and the initial tone mapping function passes through the fifteenth interpolation point. A derivative value of the fifth spline function at the fifteenth interpolation point is different from a derivative value of the initial tone mapping function at the fifteenth interpolation point.

On one side of the fifteenth interpolation point, the fifth spline function is located above the initial tone mapping function, and on the other side of the fifteenth interpolation point, the fifth spline function is located below the initial tone mapping function. By defining a location of the fifteenth interpolation point, a modification manner of the initial tone mapping function may be defined.

In an example, the third spline function is smoothly connected to the initial tone mapping curve at the ninth interpolation point. It may be considered that the ninth interpolation point is a point on the initial tone mapping function. Therefore, coordinates of the ninth interpolation point can be obtained. In addition, a derivative of the third spline function at the ninth interpolation point is equal to a derivative of the initial tone mapping function at the ninth interpolation point. Due to an attribute of the spline function itself, a first-order derivative of the third spline function at the eighth interpolation point is continuous, and a second-order derivative of the third spline function at the eighth interpolation point is continuous. Therefore, the third spline function may be divided into a fourth spline function that passes through the seventh interpolation point and the eighth interpolation point, and a fifth spline function that passes through the eighth interpolation point and the ninth interpolation point. A first-order derivative value of the fourth spline function at the eighth interpolation point is the same as a first-order derivative value of the fifth spline function at the eighth interpolation point. A second-order derivative value of the fourth spline function at the eighth interpolation point is the same as a second-order derivative value of the fifth spline function at the eighth interpolation point. Therefore, coordinates of the seventh interpolation point need to be further determined.

A manner of determining the coordinates of the seventh interpolation point may be determining based on an empirical value. For example, it is determined that the coordinates of the seventh interpolation point are (0, 0) or (1, 1).

A case in which the third spline function is smoothly connected to the initial tone mapping curve at the seventh interpolation point is similar to a case in which the third spline function is smoothly connected to the initial tone mapping curve at the ninth interpolation point. Details are not described herein.

Optionally, a derivative of the third spline function is always greater than 0.

In other words, a derivative of the spline function at every point is always greater than 0. With this restriction, an excessively large difference between a finally obtained spline function and the initial tone mapping curve can be avoided, and an excessive modification is avoided.

Optionally, the plurality of interpolation points further include an eleventh interpolation point, the third spline function passes through the eleventh interpolation point, and a second-order derivative of the first spline function at the eleventh interpolation point is 0.

The point whose second-order derivative is 0 may be an inflection point of the first spline function. For example, the third spline function increases rapidly on one side of the eleventh interpolation point and increases at a reduced speed on the other side of the eleventh interpolation point.

Optionally, the plurality of interpolation points further include a fifteenth interpolation point, the third spline function passes through the fifteenth interpolation point, and the initial tone mapping function passes through the fifteenth interpolation point. A derivative value of the third spline function at the fifteenth interpolation point is different from a derivative value of the initial tone mapping function at the fifteenth interpolation point.

On one side of the fifteenth interpolation point, the third spline function is located above the initial tone mapping function, and on the other side of the fifteenth interpolation point, the third spline function is located below the initial tone mapping function. By defining a location of the fifteenth interpolation point, a modification manner of the initial tone mapping function may be defined.

Scenario 1

When the image is dark, a part of the initial tone mapping curve that is close to the first endpoint may be modified. The seventh interpolation point may be the foregoing first interpolation point, the eighth interpolation point may be the foregoing second interpolation point, and the ninth interpolation point may be the foregoing third interpolation point. Locations of the interpolation points and spline functions are shown in FIG. 5.

The foregoing has described how to obtain the first coordinate values of the first interpolation point, the second interpolation point, and the third interpolation point. In other words, the first coordinate value of the seventh interpolation point, the first coordinate value of the eighth interpolation point, and the first coordinate value of the ninth interpolation point are all known.

First, a first offset is obtained. For example, the first offset is preset to 0.01.

Then the second coordinate value of the eighth interpolation point (point 2' in FIG. 4) is determined based on the first offset. For example, $f_3(x_2)=f_0(x_2)+0.01$, where $f_0(x)$ represents the initial tone mapping function.

Because the first coordinate value of the seventh interpolation point is the same as the first coordinate value of the first endpoint of the initial tone mapping function, it may be determined that the third spline function is a function passing through the origin, that is, coordinates of the seventh interpolation point are (0, 0).

Then the third spline function $f_3(x)$ that passes through the seventh interpolation point, the eighth interpolation point, and the ninth interpolation point (that is, passing through the point 1', the point 2', and the point 4' in FIG. 4) is determined. The third spline function $f_3(x)$ may be divided into a fourth spline function $f_4(x)$ that passes through the seventh interpolation point and the eighth interpolation point, and a fifth spline function $f_5(x)$ that passes through the eighth interpolation point and the ninth interpolation point.

$f_4(x_1)=0$, and $f_4(x_2)=f_0(x_2)+0.01$, and $f_5(x_2)=f_0(x_2)+0.01$ may be determined based on the coordinates of the seventh interpolation point and coordinates of the eighth interpolation point.

Based on the initial tone mapping function $f_0(x)$ and the first coordinate value $x_4$ of the ninth interpolation point, it may be determined that a function of the fifth spline function at the ninth interpolation point is $f_5(x_4)=f_0(x_4)$, and that a derivative of the fifth spline function at the ninth interpolation point is $f_5'(x_4)=f_0'(x_4)$.

Based on an attribute of the spline function, it may be determined that a first-order derivative of the fourth spline function at the eighth interpolation point is the same as a first-order derivative of the fifth spline function at the eighth interpolation point, and that a second-order derivative of the fourth spline function at the eighth interpolation point is the same as a second-order derivative of the fifth spline function at the eighth interpolation point, that is, $f_5'(x_2)=f_4'(x_2)$, and $f_5''(x_2)=f_4''(x_2)$.

Optionally, the third spline function is a cubic spline function. The fourth spline function and the fifth spline function may be cubic spline functions.

Optionally, the plurality of interpolation points further include an eleventh interpolation point, the fourth spline function passes through the eleventh interpolation point, and a second-order derivative of the first spline function at the eleventh interpolation point is 0.

Optionally, the plurality of interpolation points further include an eleventh interpolation point, the fifth spline function passes through the eleventh interpolation point, and a second-order derivative of the second spline function at the eleventh interpolation point is 0. The eleventh interpolation point may be a point 3' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the fourth spline function at the fifteenth interpolation point is different from a derivative value of the initial tone mapping function at the fifteenth interpolation point.

Optionally, the plurality of interpolation points further include a fifteenth interpolation point, the fifth spline function passes through the fifteenth interpolation point, and the initial tone mapping function passes through the fifteenth interpolation point. A derivative value of the fifth spline function at the fifteenth interpolation point is different from a derivative value of the initial tone mapping function at the fifteenth interpolation point. The fifteenth interpolation point may be a point 3' shown in FIG. 4.

Scenario 2

When the image is bright, a part of the initial tone mapping curve that is close to the second endpoint may be modified. The seventh interpolation point may be the foregoing fourth interpolation point, the eighth interpolation point may be the foregoing fifth interpolation point, and the ninth interpolation point may be the foregoing sixth interpolation point. Locations of the interpolation points and spline functions are shown in FIG. 6.

The foregoing has described how to obtain the first coordinate values of the fourth interpolation point, the fifth interpolation point, and the sixth interpolation point. In other words, the first coordinate value of the seventh interpolation point, the first coordinate value of the eighth interpolation point, and the first coordinate value of the ninth interpolation point are all known.

First, a first offset is obtained. For example, the first offset is preset to −0.01.

Then the second coordinate value of the eighth interpolation point (point 6' in FIG. 4) is determined based on the first offset. For example, $f_3(x_6)=f_0(x_6)-0.01$, where $f_0(x)$ represents the initial tone mapping function.

Because the first coordinate value of the seventh interpolation point is the same as the first coordinate value of the first endpoint of the initial tone mapping function, it may be determined that the third spline function is a function passing through (1, 1), that is, coordinates of the seventh interpolation point are (1, 1).

Then the third spline function $f_3(x)$ that passes through the seventh interpolation point, the eighth interpolation point, and the ninth interpolation point (that is, passing through the point 5', the point 6', and the point 8' in FIG. 4) is determined. The third spline function $f_3(x)$ may be divided into a fourth spline function $f_4(x)$ that passes through the seventh interpolation point and the eighth interpolation point, and a fifth spline function $f_5(x)$ that passes through the eighth interpolation point and the ninth interpolation point.

$f_4(x_5)=1$, $f_4(x_6)=f_0(x_6)-0.01$, and $f_5(x_6)=f_0(x_6)-0.01$ may be determined based on the coordinates of the seventh interpolation point and coordinates of the eighth interpolation point.

Based on the initial tone mapping function $f_0(x)$ and the first coordinate value $x_8$ of the ninth interpolation point, it may be determined that a function of the fifth spline function at the ninth interpolation point is $f_5(x_8)=f_0(x_8)$, and that a derivative of the fifth spline function at the ninth interpolation point is $f_5'(x_8)=f_0'(x_8)$.

Based on an attribute of the spline function, it may be determined that a first-order derivative of the fourth spline function at the eighth interpolation point is the same as a first-order derivative of the fifth spline function at the eighth interpolation point, and that a second-order derivative of the fourth spline function at the eighth interpolation point is the same as a second-order derivative of the fifth spline function at the eighth interpolation point, that is, $f_5'(x_6)=f_4'(x_6)$, and $f_5''(x_6)=f_4''(x_6)$.

Optionally, the third spline function is a cubic spline function. The fourth spline function and the fifth spline function may be cubic spline functions.

Optionally, the plurality of interpolation points further include an eleventh interpolation point, the fourth spline function passes through the eleventh interpolation point, and a second-order derivative of the first spline function at the eleventh interpolation point is 0.

Optionally, the plurality of interpolation points further include an eleventh interpolation point, the fifth spline function passes through the eleventh interpolation point, and a second-order derivative of the second spline function at the eleventh interpolation point is 0. The eleventh interpolation point may be a point 7' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the fourth spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the fifth spline function at the fifteenth interpolation point is different from a derivative value of the initial tone mapping function at the fifteenth interpolation point. The fifteenth interpolation point may be a point 7' shown in FIG. 4.

Scenario 3
Method 1

The eighth interpolation point may be the foregoing twelfth interpolation point. The seventh interpolation point may be the foregoing fourteenth interpolation point whose first coordinate value is less than the first coordinate value of the twelfth interpolation point and less than the first coordinate value of the foregoing thirteenth interpolation point. The ninth interpolation point may be the foregoing fourteenth interpolation point whose first coordinate value is greater than the first coordinate value of the twelfth interpolation point and greater than the first coordinate value of the thirteenth interpolation point. In this scenario, the spline function includes a fourth spline function that passes through the twelfth interpolation point and the thirteenth interpolation point, and a fifth spline function that passes through the thirteenth interpolation point and the fourteenth interpolation point. Locations of the interpolation points and spline functions are shown in FIG. 7.

The foregoing has described how to obtain the first coordinate values of the twelfth interpolation point, the thirteenth interpolation point, and the fourteenth interpolation point. In other words, the first coordinate value of the seventh interpolation point, the first coordinate value of the eighth interpolation point, and the first coordinate value of the ninth interpolation point are all known.

First, a first offset is obtained. For example, the first offset is preset to 0.01.

Then the second coordinate value of the eighth interpolation point (point 10' in FIG. 4) is determined based on the first offset. For example, $f_3(x_{10})=f_0(x_{10})+0.01$, where $f_0(x)$ represents the initial tone mapping function.

Because the third spline function is smoothly connected to the initial tone mapping function at the seventh interpolation point, it can be determined that coordinates of the seventh interpolation point are $(x_9, f_0(x_9))$, and $f_3(x_9)=f_0(x_9)$, and $f_3'(x_9)=f_0'(x_9)$.

Because the third spline function is smoothly connected to the initial tone mapping function at the ninth interpolation point, it can be determined that coordinates of the ninth interpolation point are $(x_{12}, f_0(x_{12}))$, and $f_3(x_{12})=f_0(x_{12})$, and $f_3'(x_{12})=f_0'(x_{12})$.

Then the third spline function $f_3(x)$ that passes through the seventh interpolation point, the eighth interpolation point, and the ninth interpolation point (that is, passing through the point 9', the point 10', and the point 12' in FIG. 4) is determined. The third spline function $f_3(x)$ may be divided into a fourth spline function $f_4(x)$ that passes through the seventh interpolation point and the eighth interpolation point, and a fifth spline function $f_5(x)$ that passes through the eighth interpolation point and the ninth interpolation point.

$f_4(x_9)=f_0(x_9)$, and $f_4'(x_9)=f_0'(x_9)$, and $f_4(x_{10})=f_0(x_{10})+0.01$ may be determined based on the initial tone mapping function $f_0(x)$, the coordinates of the seventh interpolation point, and coordinates of the eighth interpolation point.

$f_5(x_{10})=f_0(x_{10})+0.01$, and $f_5(x_{12})=f_0(x_{12})$, and $f_5'(x_{12})=f_0'(x_{12})$ may be determined based on the initial tone mapping function $f_0(x)$, the coordinates of the eighth interpolation point, and coordinates of the ninth interpolation point.

Based on an attribute of the spline function, it may be determined that a first-order derivative of the fourth spline function at the eighth interpolation point is the same as a first-order derivative of the fifth spline function at the eighth interpolation point, and that a second-order derivative of the fourth spline function at the eighth interpolation point is the same as a second-order derivative of the fifth spline function at the eighth interpolation point, that is, $f_5'(x_{10})=f_4'(x_{10})$, and $f_5''(x_{10})=f_4''(x_{10})$.

Optionally, the third spline function is a cubic spline function. The fourth spline function and the fifth spline function may be cubic spline functions.

Optionally, the plurality of interpolation points further include an eleventh interpolation point, the fourth spline function passes through the eleventh interpolation point, and a second-order derivative of the first spline function at the eleventh interpolation point is 0.

Optionally, the plurality of interpolation points further include an eleventh interpolation point, the fifth spline function passes through the eleventh interpolation point, and a second-order derivative of the second spline function at the eleventh interpolation point is 0. The eleventh interpolation point may be the point 11' shown in FIG. 4.

Optionally, the plurality of interpolation points further include a fifteenth interpolation point, the first spline function passes through the fifteenth interpolation point, and the initial tone mapping function passes through the fifteenth interpolation point. A derivative value of the fourth spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the fifth spline function at the fifteenth interpolation point is different from a derivative value of the initial tone mapping function at the fifteenth interpolation point. The fifteenth interpolation point may be the point 11' shown in FIG. 4.

Method 2

The eighth interpolation point may be the foregoing twelfth interpolation point. The tenth interpolation point may be the foregoing thirteenth interpolation point. The seventh interpolation point may be the foregoing fourteenth interpolation point whose first coordinate value is less than the first coordinate value of the twelfth interpolation point and less than the first coordinate value of the thirteenth interpolation point. The ninth interpolation point may be the foregoing fourteenth interpolation point whose first coordinate value is greater than the first coordinate value of the twelfth interpolation point and greater than the first coordinate value of the thirteenth interpolation point. In this scenario, the spline function includes a fourth spline function that passes through the twelfth interpolation point and the thirteenth interpolation point, and a fifth spline function that passes through the thirteenth interpolation point and the fourteenth interpolation point. Locations of the interpolation points and spline functions are shown in FIG. 7.

The foregoing has described how to obtain the first coordinate values of the twelfth interpolation point, the thirteenth interpolation point, and the fourteenth interpolation point. In other words, the first coordinate value of the seventh interpolation point, the first coordinate value of the eighth interpolation point, the first coordinate value of the ninth interpolation point, and the first coordinate value of the tenth interpolation point are all known.

First, a first offset is obtained. For example, the first offset is preset to −0.01.

Then the second coordinate value of the eighth interpolation point (point 10' in FIG. 4) is determined based on the first offset. For example, $f_3(x_{10})=f_0(x_{10})-0.01$, where $f_0(x)$ represents the initial tone mapping function.

Then a second offset is obtained. For example, the second offset is preset to +0.01.

Then the second coordinate value of the eighth interpolation point (point 11' in FIG. 4) is determined based on the first offset. For example, $f_3(x_{11})=f_0(x_{11})+0.01$, where $f_0(x)$ represents the initial tone mapping function.

Because the third spline function is smoothly connected to the initial tone mapping function at the seventh interpolation point, it can be determined that coordinates of the seventh interpolation point are $(x_9, f_0(x_9))$, and $f_3(x_9)=f_0(x_9)$, and $f_3'(x_9)=f_0'(x_9)$.

Because the third spline function is smoothly connected to the initial tone mapping function at the ninth interpolation point, it can be determined that coordinates of the ninth interpolation point are $(x_{12}, f_0(x_{12}))$, and $f_3(x_{12})=f_0(x_{12})$, and $f_3'(x_{12})=f_0'(x_{12})$.

Then the third spline function $f_3(x)$ that passes through the seventh interpolation point, the eighth interpolation point, and the ninth interpolation point (that is, passing through the point 9', the point 10', and the point 12' in FIG. 4) is determined. The third spline function $f_3(x)$ may be divided into a seventh spline function $f_7(x)$ that passes through the seventh interpolation point and the eighth interpolation point, an eighth spline function $f_8(x)$ that passes through the eighth interpolation point and the tenth interpolation point, and a ninth spline function $f_9(x)$ that passes through the tenth interpolation point and the ninth interpolation point.

$f_7(x_9)=f_0(x_9)$, and $f_7'(x_9)=f_0'(x_0)$, and $f_7(x_{10})=f_0(x_{10})-0.01$ may be determined based on the initial tone mapping function $f_0(x)$, the coordinates of the seventh interpolation point and coordinates of eighth interpolation point.

$f_8(x_{10})=f_0(x_{10})-0.01$ and $f_8(x_{11})=f_0(x_{11})+0.01$ may be determined based on the coordinates of the eighth interpolation point and coordinates of the tenth interpolation point.

$f_9(x_{12})=f_0(x_{12})$, and $f_9'(x_{12})=f_0'(x_{12})$, and $f_9(x_{11})=f_0(x_{11})+0.01$ may be determined based on the initial tone mapping function $f_0(x)$, the coordinates of the tenth interpolation point, and coordinates of the ninth interpolation point.

Based on an attribute of the spline function, it may be determined that a first-order derivative of the seventh spline function at the eighth interpolation point is the same as a first-order derivative of the eighth spline function at the eighth interpolation point, and that a second-order derivative of the seventh spline function at the eighth interpolation point is the same as a second-order derivative of the eighth spline function at the eighth interpolation point, that is, $f_7'(x_{10})=f_8'(x_{10})$, and $f_7''(x_{10})=f_8''(x_{10})$.

Based on an attribute of the spline function, it may be determined that a first-order derivative of the eighth spline function at the tenth interpolation point is the same as a first-order derivative of the ninth spline function at the tenth interpolation point, and that a second-order derivative of the eighth spline function at the tenth interpolation point is the same as a second-order derivative of the ninth spline function at the tenth interpolation point, that is, $f_8'(x_{11})=f_9'(x_{11})$, and $f_8''(x_{11})=f_9''(x_{11})$.

Based on the foregoing conditions, the third spline function $f_3(x)$ can be determined.

Optionally, the third spline function is a cubic spline function. The fourth spline function and the fifth spline function may be cubic spline functions.

Optionally, the plurality of interpolation points further include an eleventh interpolation point, the fourth spline function passes through the eleventh interpolation point, and a second-order derivative of the first spline function at the eleventh interpolation point is 0.

Optionally, the plurality of interpolation points further include an eleventh interpolation point, the fifth spline function passes through the eleventh interpolation point, and a second-order derivative of the second spline function at the eleventh interpolation point is 0.

Optionally, the plurality of interpolation points further include a fifteenth interpolation point, the first spline function passes through the fifteenth interpolation point, and the initial tone mapping function passes through the fifteenth interpolation point. A derivative value of the fourth spline function at the fifteenth interpolation point is different from a derivative value of the initial tone mapping function at the fifteenth interpolation point.

Optionally, the plurality of interpolation points further include a fifteenth interpolation point, the second spline function passes through the fifteenth interpolation point, and the initial tone mapping function passes through the fifteenth interpolation point. A derivative value of the fifth spline function at the fifteenth interpolation point is different from a derivative value of the initial tone mapping function at the fifteenth interpolation point.

204: Modify the initial tone mapping curve based on the spline function, to obtain a modified tone mapping curve of the target picture.

Modifying the initial tone mapping curve may be replacing a part of the initial tone mapping curve with the spline function. The finally obtained modified tone mapping curve includes a part of data content that originally exists on the initial tone mapping curve and data content of the spline function. The initial spline function is usually smooth, the spline function itself has a smooth attribute, and the spline function can be smoothly connected to the initial spline function at an interpolation point. Therefore, the modified tone mapping curve also has the smooth attribute.

205: Perform tone mapping on the target picture based on the modified tone mapping curve.

The electronic device may perform tone mapping on the target picture based on the modified tone mapping curve with reference to the conventional technology.

The electronic device that implements steps 201 to 205 may be the photographing device in FIG. 1, the image processing device 14 in FIG. 1, or a display device including an image processor.

A method for modifying an obtained initial tone mapping curve may make the tone mapping curve more flexible. For example, a form of the tone mapping curve may be flexibly determined based on device attributes of the display device and the photographing device, so that image displaying is more vivid and natural. For another example, in a video, a tone mapping curve of a frame may be determined, and for a frame adjacent to the frame, a parameter for modifying the tone mapping curve is determined, so that a video display can be improved without adding excessive data.

FIG. 8 is a schematic diagram of a structure of an image processing apparatus 500 according to an embodiment. As shown in FIG. 8, the apparatus 500 includes an obtaining module 510, a processing module 520, and a tone mapping module 530.

The obtaining module 510 is configured to obtain a target picture and an initial tone mapping curve of the target picture.

The processing module 520 is configured to determine a plurality of interpolation points based on luminance information and/or dynamic metadata of the target picture.

The processing module 520 is further configured to determine a spline function that passes through the plurality of interpolation points, where the spline function is smoothly connected to the initial tone mapping curve at at least one of the plurality of interpolation points.

The processing module 520 is further configured to modify the initial tone mapping curve based on the spline function, to obtain a modified tone mapping curve of the target picture.

The tone mapping module 530 is configured to perform tone mapping on the target picture based on the modified tone mapping curve.

Figure 9:
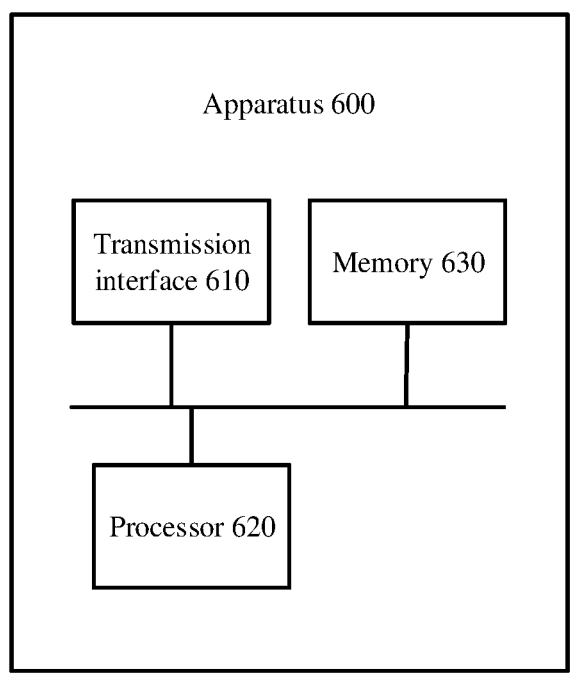
FIG. 9 is a structural diagram of an image processing apparatus according to another embodiment.

FIG. 9 is a schematic diagram of a structure of an image processing apparatus according to another embodiment. As shown in FIG. 9, the apparatus 600 may include a transmission interface 610, a processor 620, and a memory 630.

FIG. 9 shows only one memory 630 and one processor 620. In an actual image processing apparatus product, there may be one or more processors 620 and one or more memories 630. The memory 630 may also be referred to as a storage medium, a storage device, or the like. The memory 630 may be disposed independent of the processor 620 or may be integrated with the processor 620.

The transmission interface 610, the processor 620, and the memory 630 communicate with each other by using an internal connection path, to transfer a control signal and/or a data signal.

The transmission interface 610 is configured to receive or send image data. The processor 620 is configured to obtain a to-be-processed image; configured to process the to-be-processed image by using a first branch of a pre-trained neural network model, to obtain a first type of parameter, where the first type of parameter is used to perform global color processing on the image; further configured to process the to-be-processed image by using a second branch of the neural network model, to obtain a second type of parameter, where the second type of parameter is used to perform local color processing on the image; and further configured to perform color processing on the to-be-processed image based on the first type of parameter and the second type of parameter, to obtain an image that undergoes color processing.

The memory 630 described in the embodiments is configured to store computer instructions and a parameter run by the processor 620.

For a working process and beneficial effects of the apparatus 600, refer to the descriptions in the embodiment shown in FIG. 2. Details are not described herein again.

An embodiment further provides an electronic device. The electronic device may be a terminal device. The device may be configured to perform the functions/steps in the foregoing method embodiments.

Figure 10:
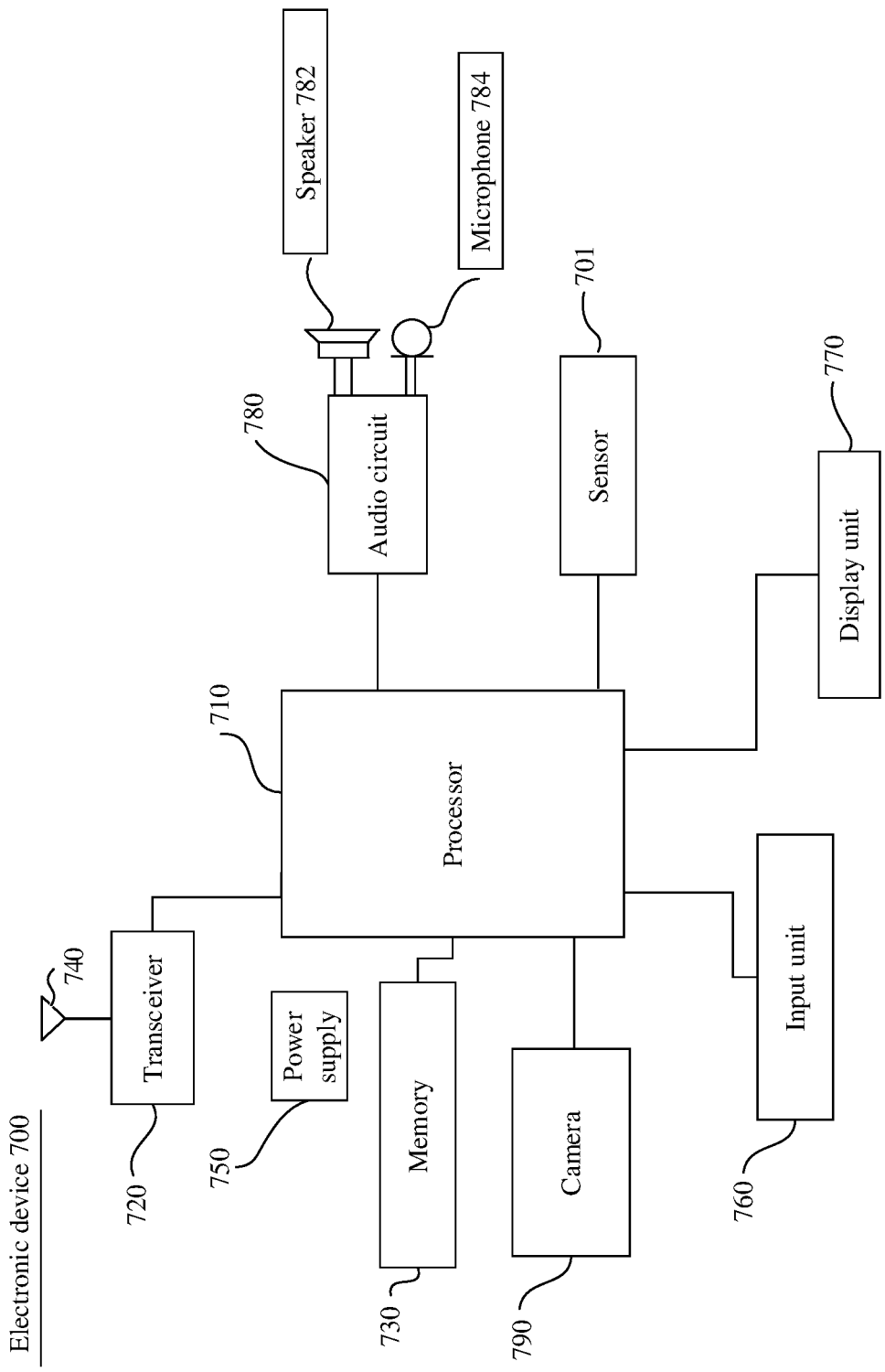
FIG. 10 is a structural diagram of an electronic device according to an embodiment.

FIG. 10 is a schematic diagram of a structure of an electronic device 700 according to an embodiment. As shown in FIG. 10, an electronic device 700 includes a processor 710 and a transceiver 720. Optionally, the electronic device 700 may further include a memory 730. The processor 710, the transceiver 720, and the memory 730 may communicate with each other through an internal connection path to transfer a control signal and/or a data signal. The memory 730 is configured to store a computer program. The processor 710 is configured to invoke the computer program from the memory 730 and run the computer program.

Optionally, the electronic device 700 may further include an antenna 740 that is configured to send a wireless signal output by the transceiver 720.

The processor 710 and the memory 730 may be integrated into one processing apparatus or may be independent of each other. The processor 710 is configured to execute program code stored in the memory 730 to implement the foregoing functions. The memory 730 may be integrated into the processor 710 or may be independent of the processor 710. The processor 710 may correspond to the processor 620 in the apparatus 600 in FIG. 9.

In addition, to improve the functions of the electronic device 700, the electronic device 700 may further include one or more of an input unit 760, a display unit 770, an audio circuit 780, a camera 790, a sensor 701, and the like. The audio circuit 780 may further include a speaker 782, a microphone 784, and the like. The display unit 770 may include a display screen.

Optionally, the electronic device 700 may further include a power supply 750, configured to supply power to various devices or circuits in the terminal device.

It should be understood that the electronic device 700 shown in FIG. 10 can implement processes of the method embodiment shown in FIG. 2. Operations and/or functions of the modules in the electronic device 700 are separately intended to implement corresponding procedures in the foregoing method embodiments. For details, refer to the descriptions in the foregoing method embodiments. To avoid repetition, detailed descriptions are properly omitted herein. A person of ordinary skill in the art may be aware that, in combination with the examples described in the embodiments, units and algorithm steps can be implemented by electronic hardware or a combination of computer software and electronic hardware. Whether the functions are performed by hardware or software depends on particular applications and design constraints of the solutions. A person skilled in the art may use different methods to implement the described functions.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions in the embodiments.

In addition, functional units in the embodiments may be integrated into one processing unit, or each of the units may exist alone physically, or two or more units are integrated into one unit.

When the functions are implemented in a form of a software functional unit and sold or used as an independent product, the functions may be stored in a non-transitory computer-readable storage medium. Based on such an understanding, some of the solutions may be implemented in a form of a software product. The computer software product is stored in a non-transitory storage medium and includes several instructions for instructing a computer device (which may be a personal computer, a server, a network device, or the like) to perform all or some of the steps of the methods described in the embodiments. The foregoing storage medium includes any non-transitory medium that can store program code, for example, a USB flash drive, a removable hard disk, a read-only memory (ROM), a random access memory (RAM), a magnetic disk, or an optical disc.

The foregoing descriptions are merely implementations, but are not intended to limit the protection scope. Any variation or replacement readily figured out by a person skilled in the art within the scope shall fall within the protection scope.

What is claimed is:

1. An image processing method, comprising:
   obtaining a target picture and an initial tone mapping curve of the target picture;
   determining a plurality of interpolation points based on luminance information and/or dynamic metadata of the target picture;
   determining a spline function that passes through the plurality of interpolation points, wherein the spline function is smoothly connected to the initial tone mapping curve at at least one of the plurality of interpolation points;
   obtaining a modified tone mapping curve of the target picture based on the initial tone mapping curve and the spline function; and
   performing tone mapping on the target picture based on the modified tone mapping curve,
   wherein the initial tone mapping curve comprises a first endpoint and a second endpoint, the first endpoint and the second endpoint are respectively located at two ends of the initial tone mapping curve, a luminance value corresponding to the first endpoint is less than a luminance value corresponding to the second endpoint, a quantity of dark region pixels comprised in the target picture is greater than or equal to a second preset threshold, luminance values of the dark region pixels are less than a first preset threshold, the plurality of interpolation points comprise a first interpolation point, and the determining the plurality of interpolation points based on luminance information of the target picture further comprises:
   determining that a first coordinate value of the first interpolation point is the same as a first coordinate value of the first endpoint.

2. The image processing method according to claim 1, wherein the plurality of interpolation points further comprise a second interpolation point, and the determining the plurality of interpolation points based on luminance information of the target picture further comprises:
   determining a first coordinate value of the second interpolation point based on the quantity of the dark region pixels.

3. The image processing method according to claim 1, wherein the initial tone mapping curve comprises the first endpoint and the second endpoint, the first endpoint and the second endpoint are respectively located at the two ends of the initial tone mapping curve, the luminance value corresponding to the first endpoint is less than the luminance value corresponding to the second endpoint, a quantity of bright region pixels comprised in the target picture is greater than or equal to a fourth preset threshold, luminance values of the bright region pixels are greater than a third preset threshold, the plurality of interpolation points comprise a fourth interpolation point, and the determining the plurality of interpolation points based on luminance information of the target picture further comprises:
   determining that a first coordinate value of the fourth interpolation point is the same as a first coordinate value of the second endpoint.

4. The image processing method according to claim 1, wherein the plurality of interpolation points comprise a seventh interpolation point, an eighth interpolation point, and a ninth interpolation point, the spline function comprises a third spline function that passes through the seventh interpolation point, the eighth interpolation point, and the ninth interpolation point, and a first coordinate value of the eighth interpolation point is between a first coordinate value of the seventh interpolation point and a first coordinate value of the ninth interpolation point;
   before determining the plurality of interpolation points, the method further comprises:
   obtaining a first offset, wherein the first offset is used to represent a modification range of the initial tone mapping curve at a first modification position, and the first modification position is the first coordinate value of the eighth interpolation point, determining the plurality of interpolation points further comprises:
   determining a second coordinate value of the eighth interpolation point based on a function value of the initial tone mapping curve at the first modification position and the first offset, and
   determining the spline function that passes through the plurality of interpolation points further comprises:
   determining the third spline function based on the first coordinate value of the eighth interpolation point and the second coordinate value of the eighth interpolation point, wherein the third spline function is smoothly connected to the initial tone mapping curve at the seventh interpolation point and/or the ninth interpolation point.

5. The image processing method according to claim 4, wherein the third spline function comprises a fourth spline function that passes through the seventh interpolation point and the eighth interpolation point, and a fifth spline function that passes through the eighth interpolation point and the ninth interpolation point, and a second-order derivative value of the fourth spline function at the eighth interpolation point is the same as a second-order derivative value of the fifth spline function at the eighth interpolation point.

6. The image processing method according to claim 4, wherein the plurality of interpolation points further comprise a tenth interpolation point, the third spline function passes through the tenth interpolation point, and a first coordinate value of the tenth interpolation point is between the first coordinate value of the seventh interpolation point and the first coordinate value of the ninth interpolation point,
before determining the plurality of interpolation points, the method further comprises:
obtaining a second offset, wherein the second offset is used to represent a modification range of the initial tone mapping curve at a second modification position, and the second modification position is the first coordinate value of the tenth interpolation point,
determining the plurality of interpolation points further comprises:
determining a second coordinate value of the tenth interpolation point based on a function value of the initial tone mapping curve at the second modification position and the second offset; and
determining the third spline function based on the first coordinate value of the eighth interpolation point and the second coordinate value of the eighth interpolation point further comprises:
determining the third spline function based on the first coordinate value and the second coordinate value of the eighth interpolation point, and the first coordinate value and the second coordinate value of the tenth interpolation point, wherein the third spline function is smoothly connected to the initial tone mapping curve at both the seventh interpolation point and the ninth interpolation point.

7. The image processing method according to claim 1, wherein the initial tone mapping curve comprises one of the following formulas:

$$L' = a \times \left( \frac{p \times L}{(p-1) \times L + 1} \right)^m + b;$$

$$L' = a \times L + b;$$

$$L' = \frac{c_1 + c_2 \times L^n}{1 + c_3 \times L^n}; \text{ and}$$

$$L' \sum_{\rho=0}^{N} \binom{N}{\rho} \times L^\rho \times (1-L)^{N-\rho} \times P_\rho,$$

wherein L represents a linear signal value, L' represents a nonlinear signal value, p, a, m, b, $c_1$, $c_2$, $c_3$, n, N, and ρ are all dynamic range mapping coefficients, and 0≤L≤1.

8. An image processing apparatus, comprising a processor and a transmission interface, wherein
the transmission interface is configured to receive or send image data; and
the processor is configured to invoke program instructions stored in a memory, and execute the program instructions to cause the image processing apparatus to:
obtain a target picture and an initial tone mapping curve of the target picture;
determine a plurality of interpolation points based on luminance information and/or dynamic metadata of the target picture;
determine a spline function that passes through the plurality of interpolation points, wherein the spline function is smoothly connected to the initial tone mapping curve at at least one of the plurality of interpolation points;
obtain a modified tone mapping curve of the target picture based on the initial tone mapping curve and the spline function; and
perform tone mapping on the target picture based on the modified tone mapping curve
wherein the initial tone mapping curve comprises a first endpoint and a second endpoint, the first endpoint and the second endpoint are respectively located at two ends of the initial tone mapping curve, a luminance value corresponding to the first endpoint is less than a luminance value corresponding to the second endpoint, a quantity of dark region pixels comprised in the target picture is greater than or equal to a second preset threshold, luminance values of the dark region pixels are less than a first preset threshold, the plurality of interpolation points comprise a first interpolation point, wherein the processor is further configured to execute the program instructions to cause the image processing apparatus to:
determine that a first coordinate value of the first interpolation point is the same as a first coordinate value of the first endpoint.

9. The image processing apparatus according to claim 8, wherein the plurality of interpolation points further comprise a second interpolation point, and wherein the processor is further configured to execute the program instructions to cause the image processing apparatus to:
determine a first coordinate value of the second interpolation point based on the quantity of the dark region pixels.

10. The image processing apparatus according to claim 8, wherein the initial tone mapping curve comprises the first endpoint and the second endpoint, the first endpoint and the second endpoint are respectively located at the two ends of the initial tone mapping curve, the luminance value corresponding to the first endpoint is less than the luminance value corresponding to the second endpoint, a quantity of bright region pixels comprised in the target picture is greater than or equal to a fourth preset threshold, luminance values of the bright region pixels are greater than a third preset threshold, the plurality of interpolation points comprise a fourth interpolation point, and determining the plurality of interpolation points based on luminance information of the target picture further comprises:
determining that a first coordinate value of the fourth interpolation point is the same as a first coordinate value of the second endpoint.

11. The image processing apparatus according to claim 8, wherein the plurality of interpolation points comprise a seventh interpolation point, an eighth interpolation point, and a ninth interpolation point, the spline function comprises a third spline function that passes through the seventh interpolation point, the eighth interpolation point, and the ninth interpolation point, and a first coordinate value of the eighth interpolation point is between a first coordinate value of the seventh interpolation point and a first coordinate value of the ninth interpolation point;

before determining the plurality of interpolation points, wherein the processor is further configured to execute the program instructions to cause the image processing apparatus to:

obtain a first offset, wherein the first offset is used to represent a modification range of the initial tone mapping curve at a first modification position, and the first modification position is the first coordinate value of the eighth interpolation point;

determine a second coordinate value of the eighth interpolation point based on a function value of the initial tone mapping curve at the first modification position and the first offset; and determine the third spline function based on the first coordinate value of the eighth interpolation point and the second coordinate value of the eighth interpolation point, wherein the third spline function is smoothly connected to the initial tone mapping curve at the seventh interpolation point and/or the ninth interpolation point.

12. The image processing apparatus according to claim 11, wherein the plurality of interpolation points further comprise a tenth interpolation point, the third spline function passes through the tenth interpolation point, and a first coordinate value of the tenth interpolation point is between the first coordinate value of the seventh interpolation point and the first coordinate value of the ninth interpolation point;

before determining the plurality of interpolation points, wherein the processor is further configured to execute the program instructions to cause the image processing apparatus to:

obtain a second offset, wherein the second offset is used to represent a modification range of the initial tone mapping curve at a second modification position, and the second modification position is the first coordinate value of the tenth interpolation point;

determine a second coordinate value of the tenth interpolation point based on a function value of the initial tone mapping curve at the second modification position and the second offset;

determine the third spline function based on the first coordinate value and the second coordinate value of the eighth interpolation point, and the first coordinate value and the second coordinate value of the tenth interpolation point, wherein the third spline function is smoothly connected to the initial tone mapping curve at both the seventh interpolation point and the ninth interpolation point.

13. The image processing apparatus according to claim 8, wherein the initial tone mapping curve comprises one of the following formulas:

$$L' = a \times \left(\frac{p \times L}{(p-1) \times L + 1}\right)^m + b;$$

$$L' = a \times L + b;$$

$$L' = \frac{c_1 + c_2 \times L^n}{1 + c_3 \times L^n}; \text{ and}$$

$$L' \sum_{\rho=0}^{N} \binom{N}{\rho} \times L^\rho \times (1-L)^{N-\rho} \times P_\rho,$$

wherein L represents a linear signal value, L' represents a nonlinear signal value, p, a, m, b, $c_1$, $c_2$, $c_3$, n, N, and $\rho$ are all dynamic range mapping coefficients, and $0 \leq L \leq 1$.

14. A non-transitory computer-readable storage medium, wherein the non-transitory computer-readable storage medium stores instructions; and when the instructions are run on a computer or a processor, the computer or the processor is enabled to:

obtain a target picture and an initial tone mapping curve of the target picture;

determine a plurality of interpolation points based on luminance information and/or dynamic metadata of the target picture;

determine a spline function that passes through the plurality of interpolation points, wherein the spline function is smoothly connected to the initial tone mapping curve at at least one of the plurality of interpolation points;

obtain a modified tone mapping curve of the target picture based on the initial tone mapping curve and the spline function; and perform tone mapping on the target picture based on the modified tone mapping curve, wherein the initial tone mapping curve comprises a first endpoint and a second endpoint, the first endpoint and the second endpoint are respectively located at two ends of the initial tone mapping curve, a luminance value corresponding to the first endpoint is less than a luminance value corresponding to the second endpoint, a quantity of dark region pixels comprised in the target picture is greater than or equal to a second preset threshold, luminance values of the dark region pixels are less than a first preset threshold, the plurality of interpolation points comprise a first interpolation point, wherein the computer or the processor is further enabled to:

determine that a first coordinate value of the first interpolation point is the same as a first coordinate value of the first endpoint.

15. The non-transitory computer-readable storage medium according to claim 14, wherein the plurality of interpolation points comprise a seventh interpolation point, an eighth interpolation point, and a ninth interpolation point, the spline function comprises a third spline function that passes through the seventh interpolation point, the eighth interpolation point, and the ninth interpolation point, and a first coordinate value of the eighth interpolation point is between a first coordinate value of the seventh interpolation point and a first coordinate value of the ninth interpolation point, before determining the plurality of interpolation points, wherein the computer or the processor is further enabled to:

obtain a first offset, wherein the first offset is used to represent a modification range of the initial tone mapping curve at a first modification position, and the first modification position is the first coordinate value of the eighth interpolation point;

determine a second coordinate value of the eighth interpolation point based on a function value of the initial tone mapping curve at the first modification position and the first offset; and determine the third spline function based on the first coordinate value of the eighth interpolation point and the second coordinate value of the eighth interpolation point, wherein the third spline function is smoothly connected to the initial tone mapping curve at the seventh interpolation point and/or the ninth interpolation point.

16. The non-transitory computer-readable storage medium according to claim 14, wherein the plurality of interpolation points further comprise a tenth interpolation point, the third spline function passes through the tenth interpolation point, and a first coordinate value of the tenth interpolation point is between the first coordinate value of the seventh interpolation point and the first coordinate value of the ninth interpolation point;
- before determining the plurality of interpolation points, wherein the computer or the processor is further enabled to:
- obtain a second offset, wherein the second offset is used to represent a modification range of the initial tone mapping curve at a second modification position, and the second modification position is the first coordinate value of the tenth interpolation point;
- determine a second coordinate value of the tenth interpolation point based on a function value of the initial tone mapping curve at the second modification position and the second offset;
- determine the third spline function based on the first coordinate value and the second coordinate value of the eighth interpolation point, and the first coordinate value and the second coordinate value of the tenth interpolation point, wherein the third spline function is smoothly connected to the initial tone mapping curve at both the seventh interpolation point and the ninth interpolation point.

17. The non-transitory computer-readable storage medium according to claim 14, wherein the initial tone mapping curve comprises one of the following formulas:

$$L' = a \times \left( \frac{p \times L}{(p-1) \times L + 1} \right)^m + b;$$

$$L' = a \times L + b;$$

$$L' = \frac{c_1 + c_2 \times L^n}{1 + c_3 \times L^n}; \text{ and}$$

$$L' \sum_{\rho=0}^{N} \binom{N}{\rho} \times L^\rho \times (1-L)^{N-\rho} \times P_\rho,$$

wherein L represents a linear signal value, L' represents a nonlinear signal value, p, a, m, b, $c_1$, $c_2$, $c_3$, n, N, and $\rho$ are all dynamic range mapping coefficients, and $0 \leq L \leq 1$.

* * * * *